US009071290B2

(12) United States Patent
Österling

(10) Patent No.: US 9,071,290 B2
(45) Date of Patent: Jun. 30, 2015

(54) COMP OPERATION IN CELLULAR COMMUNICATION NETWORKS

(75) Inventor: Jacob Österling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 211 days.

(21) Appl. No.: 12/945,001

(22) Filed: Nov. 12, 2010

(65) Prior Publication Data
US 2012/0114050 A1 May 10, 2012

Related U.S. Application Data

(63) Continuation of application No. PCT/EP2010/066894, filed on Nov. 5, 2010.

(51) Int. Cl.
H04B 7/14 (2006.01)
H04B 7/02 (2006.01)

(52) U.S. Cl.
CPC .................... H04B 7/024 (2013.01)

(58) Field of Classification Search
CPC ............. H04B 7/024; H04W 72/085; H04W 72/0426; H04W 72/0433; H04W 52/24
USPC ........... 370/328, 332, 334, 339; 455/15, 67.1, 455/452.2, 553.1, 562.1, 507
See application file for complete search history.

(56) References Cited

U.S. PATENT DOCUMENTS

2002/0093943 A1 7/2002 Oliveira
2007/0127459 A1 6/2007 Lo et al.
2008/0051037 A1* 2/2008 Molnar et al. ................. 455/70
2008/0118004 A1 5/2008 Forenza et al.
2008/0273503 A1 11/2008 Lee et al.
2009/0257533 A1 10/2009 Lindoff et al.
(Continued)

FOREIGN PATENT DOCUMENTS

EP          1 705 939 A1   9/2006
KR  10-2009-0073973 A     7/2009
(Continued)

OTHER PUBLICATIONS

Müller et al., "Performance of the LTE Uplink with Intra-Site Joint Detection and Joint Link Adaptation", *IEEE*, 2010, 5 pages.
(Continued)

*Primary Examiner* — Dinh P Nguyen
(74) *Attorney, Agent, or Firm* — Nixon & Vanderhye, P.C.

(57) ABSTRACT

A supporting radio base station (100) comprises an IQ sample provider (110) for extracting, in a selected subset of the available frequency band (A) and/or from a selected subset of the available antennas (B), so-called complementary IQ samples based on received radio signals including a radio signal originating from an uplink transmission of at least one UE served by a serving radio base station (200). The supporting radio base station (100) comprises an IQ sample transmitter (120) for transmitting the complementary IQ samples to the serving radio base station (200) to enable the serving radio base station to decode user data of the uplink transmission based on the complementary IQ samples together with own IQ samples provided by the serving radio base station (200). This will provide significant savings of bit rate for the exchange of IQ samples between the radio base stations.

33 Claims, 18 Drawing Sheets

(56) References Cited

U.S. PATENT DOCUMENTS

| | | | |
|---|---|---|---|
| 2010/0002643 | A1 | 1/2010 | Han et al. |
| 2010/0067604 | A1 | 3/2010 | Bhadra et al. |
| 2010/0104033 | A1 | 4/2010 | Gorokhov |
| 2010/0304751 | A1* | 12/2010 | Ji et al. .......................... 455/450 |
| 2010/0323611 | A1* | 12/2010 | Choudhury ...................... 455/7 |
| 2011/0075611 | A1 | 3/2011 | Choi |
| 2011/0305185 | A1 | 12/2011 | Kwon et al. |
| 2012/0114050 | A1 | 5/2012 | Osterling |
| 2012/0231739 | A1 | 9/2012 | Chen et al. |

FOREIGN PATENT DOCUMENTS

| | | |
|---|---|---|
| WO | 02/44827 A2 | 6/2002 |
| WO | 2010/124726 A1 | 11/2010 |

OTHER PUBLICATIONS

Hoymann et al., "Distributed Uplink Signal Processing of Cooperating Base Stations based on IQ Sample Exchange", *Ericsson Research and University of Washington*, (No Date), 5 pages.

U.S. Appl. No. 12/944,999, filed Nov. 12, 2010, entitled "Comp Operation in Cellular Communication Networks".

International Search Report and Written Opinion mailed Jul. 28, 2011 in PCT Application No. PCT/EP2010/066883.

Sushanta et al, "Implementation of Full-Diversity Distributed STBC in Cluster-Based Cooperative Communication", Vehicular Technology Conference, 2008, VTC Spring 2008, IEEE, Piscataway, NJ, USA, May 11, 2008, pp. 1216-1220.

U.S. Office Action mailed Oct. 26, 2012 in U.S. Appl. No. 12/944,999.

Hoymann, Christian, et al; "Distributed Uplink Signal Processing of Cooperating Base Stations based on IQ Sample Exchange"; Jun. 14, 2009; IEEE International Conference on Communications; pp. 1-5.

International Preliminary Report on Patentability mailed Mar. 6, 2013 in PCT Application No. PCT/EP2010/066883.

Written Opinion mailed Dec. 3, 2012 in PCT application PCT/EP2010/066883 (6 pages).

Office Action dated Apr. 4, 2013 in related U.S. Appl. No. 12/944,999 (28 pages).

* cited by examiner

COMP OPERATION IN CELLULAR COMMUNICATION NETWORKS

This application is a continuation of International Application No. PCT/EP2010/066894 filed 5 Nov. 2010, the entire contents of which is hereby incorporated by reference.

TECHNICAL FIELD

The technology disclosed herein generally relates to Coordinated MultiPoint (COMP) operation in a cellular communication network.

BACKGROUND

Coordinated MultiPoint (COMP) transmission/reception is an advanced technology for cellular communication networks to improve coverage, support high data rates, improve cell-edge throughput and/or to increase system throughput.

Downlink COMP generally implies dynamic coordination among multiple geographically separated transmission points, and uplink COMP generally implies coordination among multiple geographically separated reception points. In general, the basic idea is to perform joint transmission in the downlink by coordinating transmission from multiple points to one or more user terminals, and likewise to perform joint detection in the uplink by jointly processing radio signals received at multiple points.

As an intermediate step towards general COMP operation, so-called intra-site cooperation where different sectors of the same radio base station are coordinated has been proposed in reference [1].

It is also possible to coordinate different sectors belonging to different sites, so-called inter-site cooperation, where the data has to be exchanged between the involved radio base stations.

However, inter-site cooperation between different radio base stations provides many challenges on the way to a viable and practical solution, as outlined in reference [1]. Intra-site cooperation within the same radio base station is much easier to implement, since this approach only requires node internal transfer of data, and the delay due to the cooperation is almost negligible for intra-site cooperation. In addition, intra-site cooperation may already be realized with existing state-of-the art system, at least for the uplink, since no external signaling is involved and no hence further standardization would be required for that purpose.

Reference [2] describes a concept of distributed cooperation where base stations (BS) communicate directly via a BS-BS interface without central control. A serving base station can request cooperation from one or more supporting base stations, and by collecting In-phase and Quadrature-phase (IQ) samples from the antenna elements of the supporting base station or base stations, the serving base station can virtually increase its number of receive antennas. If the base stations of one eNodeB cooperate the required BS-BS interface can be eNodeB internal. If on the other hand, base stations of different eNodeBs cooperate, the IQ samples are exchanged via the dedicated X2 interface, the specification of which would have to be enhanced.

In general, high speed interfaces for inter-site cooperation are costly to deploy.

Although significant advances have been made in this area of research, there is still a general need for improved COMP operation in cellular radio communication networks and in particular with respect to the exchange of IQ samples between radio base stations.

SUMMARY

It is a general object to provide improved Coordinated MultiPoint (COMP) operation in a cellular communication network.

In particular, it is desirable to provide an improved solution for inter-site cooperation for the uplink as well as for the downlink.

It is a specific object to provide improved methods for COMP operation for a radio base station in a cellular communication network.

It is another specific object to provide improved radio base stations for Coordinated MultiPoint (COMP) operation in a cellular communication network.

These and other objects are met by embodiments as defined by the accompanying patent claims.

In a first aspect, there is provided a method for Coordinated MultiPoint (COMP) operation for a supporting radio base station cooperating with a serving radio base station in a cellular communication network. The supporting radio base station extracts, in a selected subset of the available frequency band and/or from a selected subset of the available antennas, In-phase and Quadrature-phase (IQ) samples, referred to as complementary IQ samples, based on received radio signals. The radio signals include a radio signal originating from an uplink transmission of at least one UE served by the serving radio base station. The supporting radio base station transmits the complementary IQ samples to the serving radio base station to enable the serving radio base station to decode user data of the uplink transmission based on the complementary IQ samples together with own IQ samples provided by the serving radio base station.

There is also provided a radio base station, referred to as a supporting radio base station, configured for Coordinated MultiPoint (COMP) operation in cooperation with a serving radio base station serving user equipment (UE) in a cellular communication network. The radio base station comprises an In-phase and Quadrature-phase (IQ) sample provider configured to extract, in a selected subset of the available frequency band and/or from a selected subset of the available antennas, IQ samples, referred to as complementary IQ samples, based on received radio signals. The radio signals include a radio signal originating from an uplink transmission of at least one UE served by the serving radio base station. The radio base station further comprises an IQ sample transmitter configured to transmit the complementary IQ samples to the serving radio base station to enable the serving radio base station to decode user data of the uplink transmission based on the complementary IQ samples together with own IQ samples provided by the serving radio base station.

In a second aspect, there is provided a method for Coordinated MultiPoint (COMP) operation for a serving radio base station serving user equipment (UE) in a cellular communication network. The serving radio base station provides In-phase and Quadrature-phase (IQ) samples, referred to as own IQ samples, based on received radio signals including a radio signal originating from an uplink transmission of at least one UE. The serving radio base station receives, from a supporting radio base station, complementary IQ samples extracted based on received radio signals at the supporting radio base station in a selected subset of the available frequency band and/or from a selected subset of the available antennas. The serving radio base station processes the own IQ samples and the complementary IQ samples to decode user data of the uplink transmission.

There is also provided a radio base station configured for Coordinated MultiPoint (COMP) operation and for serving user equipment (UE) in a cellular communication network. The radio base station comprises an In-phase and Quadrature-phase (IQ) sample provider configured to provide IQ samples, referred to as own IQ samples, based on received radio signals including a radio signal originating from an uplink transmission of at least one UE. The radio base station further comprises an IQ sample receiver configured to receive, from a supporting radio base station, complementary IQ samples extracted based on received radio signals at the supporting radio base station in a selected subset of the available frequency band and/or from a selected subset of the available antennas. The radio base station also comprises an IQ sample processor configured to process the own IQ samples and the complementary IQ samples to decode user data of the uplink transmission.

In this way, there is provided an important reduction of the bit rate required for the interface between cooperating radio base stations. This means that costly high speed interface may not be required.

This solution opens up for a viable and practical solution for inter-site COMP for the uplink as well as for the downlink in modern cellular communication networks.

Other advantages offered by the technology disclosed herein will be appreciated when reading the below description of example embodiments.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

It may be useful to start with a somewhat more detailed overview and analysis of the prior art solutions with respect to COMP operation in cellular radio communication networks.

The idea with COMP is that a serving radio base station (RBS) may utilize one or more supporting COMP RBSs as "repeaters" in the communication with the UE. For the Uplink (UL), the serving RBS thus collects samples received from the COMP RBSs, and includes them in the decoding of the UE. A serving RBS is generally the RBS that has the Radio Resource Control (RRC) connection for the considered UE. A supporting COMP RBS is generally an RBS that operates as a relay for the communication between the UE and the serving RBS. For the Downlink (DL), joint transmission is performed by coordinating downlink transmission from multiple points.

As previously mentioned, an intermediate step towards general COMP operation involves so-called intra-site cooperation where different sectors of the same radio base station are coordinated, e.g. as described in reference [1]. Intra-site cooperation may already be realized with existing state-of-the art system, at least for the uplink, since no external signaling is involved and no hence further standardization would be required for that purpose.

It is also possible to coordinate different sectors belonging to different sites, so-called inter-site cooperation, where the data has to be exchanged between radio base stations.

Figure 1:
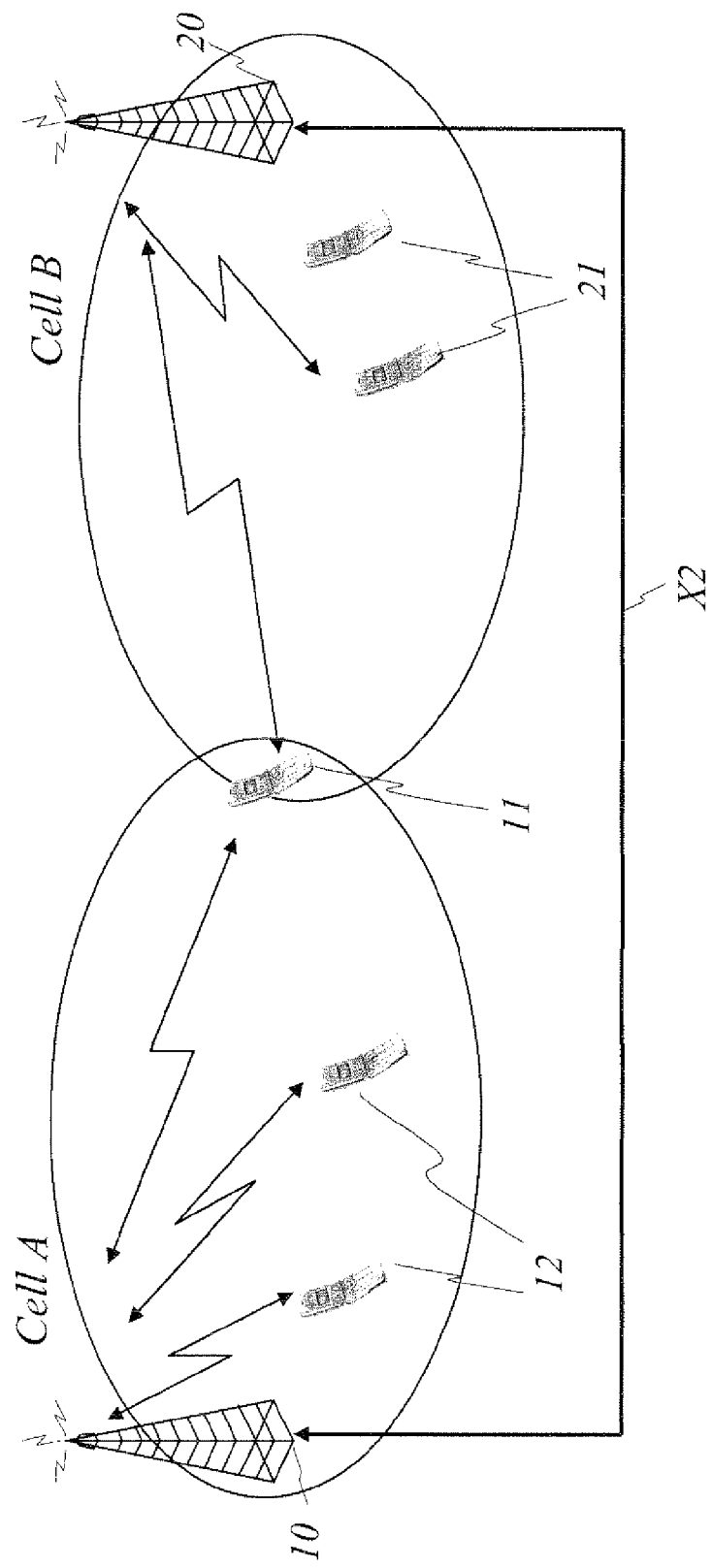
FIG. 1 is a schematic diagram illustrating an example of inter-site cooperation using the dedicated X2 interface for information exchange between radio base stations according to the prior art.

FIG. 1 is a schematic diagram illustrating an example of inter-site cooperation using the dedicated X2 interface for information exchange between radio base stations according to the prior art. In this particular example, there are two cooperating radio base stations 10 and 20. Each radio base station 10 and 20 manages one or more cells or sectors. In this example, radio base station 10 manages cell A, and radio base station 20 manages cell B. Each radio base station 10 and 20 may thus serve a number of user equipments (UEs), 12 and 21, respectively. There may also be one or more UEs 11 that is/are located in an area of overlapping coverage of two or more cells. Although UE 11 is served by e.g. radio base station 10, the radio base station 20 will also receive radio signals from the same UE. In such a scenario, the radio base station 20 may be referred to as a supporting radio base station, and so-called In-phase and Quadrature-phase (IQ) samples may be transmitted from the supporting radio base station 20 to the serving radio base station via the dedicated X2 interface to improve the chances of successful decoding, as indicated in reference [2].

This may increase coverage and allow successful decoding of an uplink transmission even though UE 11 is located close to the cell border.

In a constellation diagram, a transmitted symbol can be represented and visualized as a complex number. As well known, the real and imaginary axes are referred to as the In-phase (I) and Quadrature-phase (O) axes, respectively.

Figure 2:
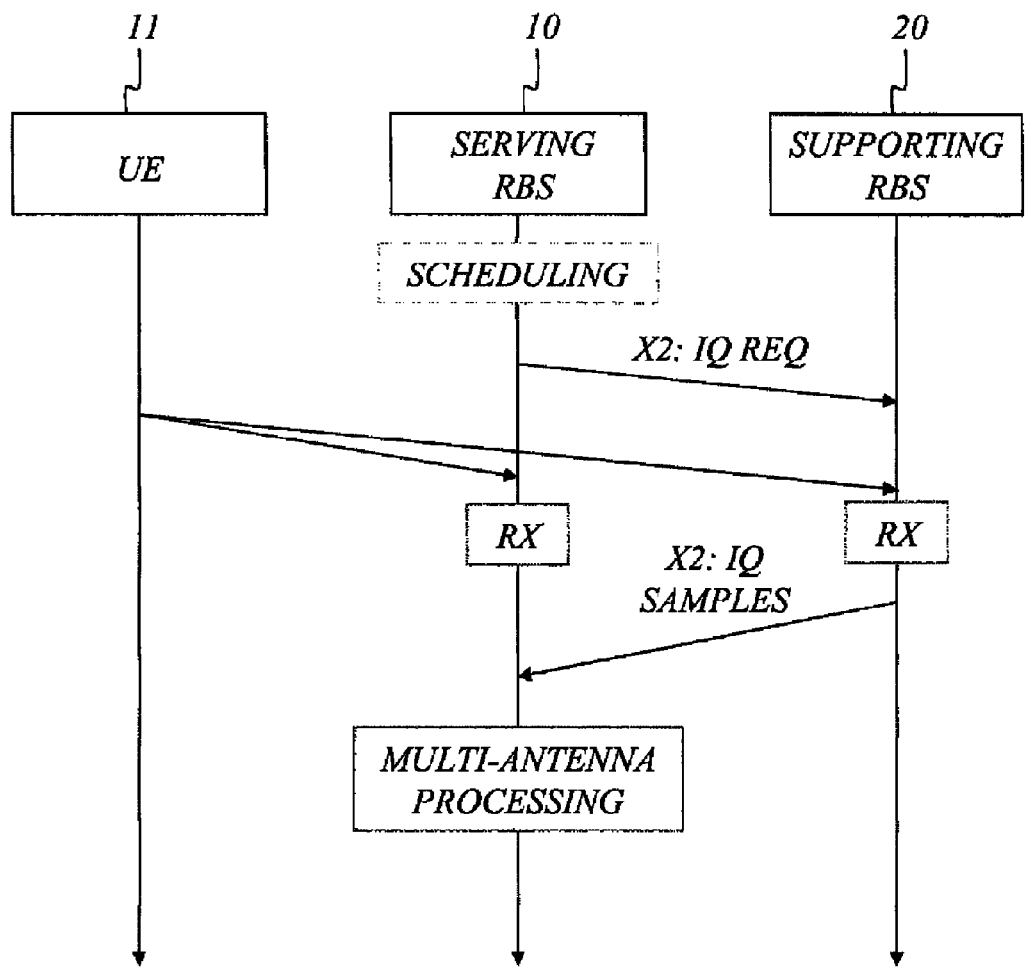
FIG. 2 is a schematic signaling diagram illustrating an example of signaling between the involved nodes for inter-site cooperation according to the prior art.

FIG. 2 is a schematic signaling diagram illustrating an example of signaling between the involved nodes for inter-site cooperation according to the prior art.

As outlined in reference [2], a given UE 11 is associated with a serving radio base station (RBS) 10. During scheduling, the serving RBS 10 allocates certain resource blocks to the UE 11 for UL transmission. The serving RBS 10 can request support from one or more radio base stations for a particular UE transmitting on certain resource blocks. The serving RBS 10 requests cooperation from the supporting RBS 20 by sending a request signal (IQ REQ) over the X2 interface. Having received the UE signal on the indicated RBSs, the supporting RBS 20 transfers IQ samples received at its antennas to the serving RBS 10 over the X2 interface. Having received IQ samples from the supporting RBS 20, the serving RBS 10 jointly processes the received signals of all antennas to enable successful decoding of user data.

In the prior art, the skilled person has chosen to use either intra-site cooperation, relying on eNodeB internal communication, or inter-site cooperation based on a dedicated BS-BS interface to transfer IQ samples between separated radio base stations.

The only feasible solution presented in the prior art for inter-site cooperation in a cellular network assumes the use of high speed interfaces between all radio base stations, or between a central radio equipment control node and multiple remote radio units. The high speed interfaces need a mesh network, which is very costly to deploy.

The inventors have recognized that there are more effective solutions for COMP operation and for exchanging IQ samples.

Figure 3:
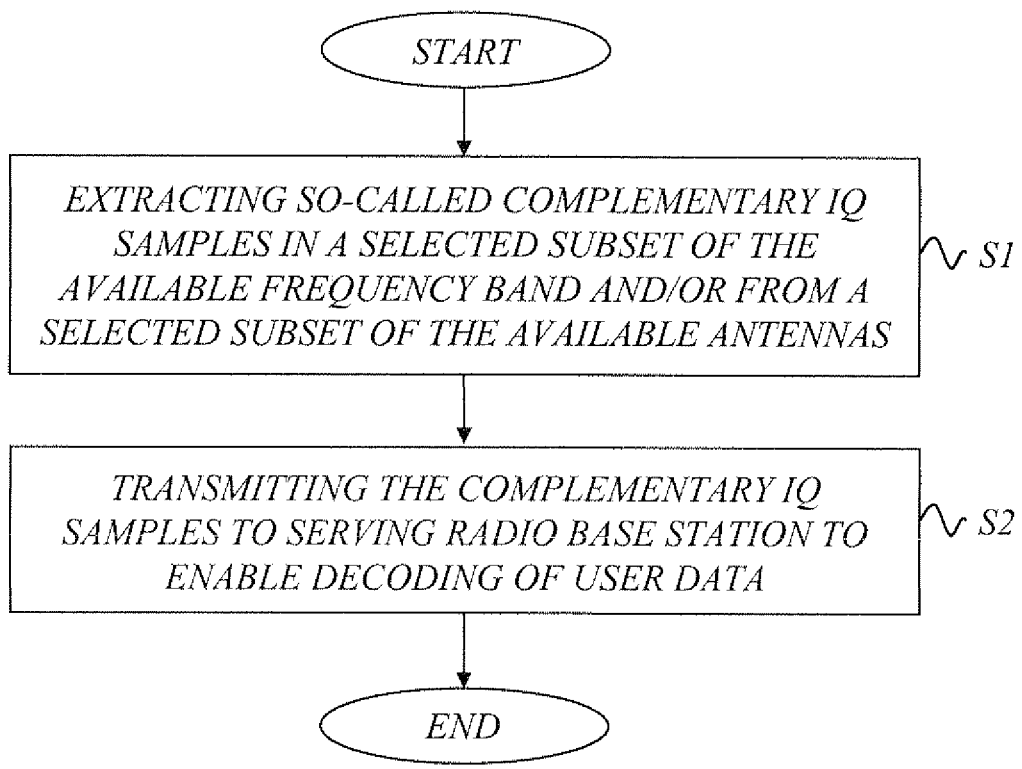
FIG. 3 is a schematic flow diagram illustrating an example of a method for COMP operation for a supporting radio base station according to an illustrative embodiment.

FIG. 3 is a schematic flow diagram illustrating an example of a method for COMP operation for a supporting radio base station according to an illustrative embodiment.

In step S1, the supporting radio base station extracts, in a selected subset of the available frequency band and/or from a selected subset of the available antennas, In-phase and Quadrature-phase (IQ) samples, referred to as complementary IQ samples, based on received radio signals including a radio signal originating from an uplink transmission of at least one UE served by the serving radio base station. In step S2, the supporting radio base station transmits the complementary IQ samples to the serving radio base station to enable the serving radio base station to decode user data of the uplink transmission based on the complementary IQ samples together with own IQ samples provided by the serving radio base station.

Figure 4:
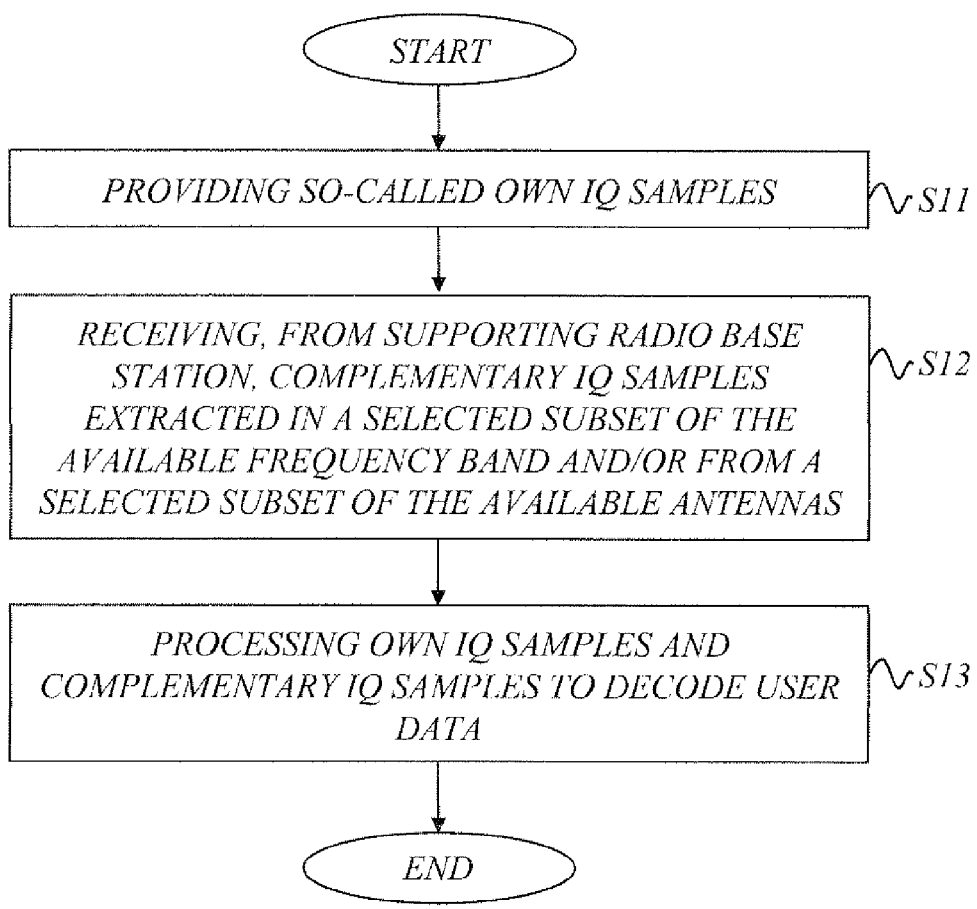
FIG. 4 is a schematic flow diagram illustrating an example of a method for COMP operation for a serving radio base station according to an illustrative embodiment.

FIG. 4 is a schematic flow diagram illustrating an example of a method for COMP operation for a serving radio base station according to an illustrative embodiment.

In step S11, the serving radio base station provides In-phase and Quadrature-phase (IQ) samples, referred to as own IQ samples, based on received radio signals including a radio signal originating from an uplink transmission of at least one UE. In step S12, the serving radio base station receives, from a supporting radio base station, complementary IQ samples extracted based on received radio signals at the supporting radio base station in a selected subset of the available frequency band and/or from a selected subset of the available antennas. In step S13, the serving radio base station processes the own IQ samples and the complementary IQ samples to decode user data of the uplink transmission.

In other words, when starting from the overall set of IQ samples corresponding to the whole available frequency band and/or all available antennas, the complementary IQ samples are extracted only in a selected subset of the frequency band and/or only from a selected subset of the antennas.

By extracting and exchanging IQ samples in a selected subset of the available frequency band and/or from a selected subset of the available antennas, there is provided an important reduction of the bit rate required for the interface between cooperating radio base stations. This means that only a limited set of IQ samples is selected for use as complementary IQ samples. The remaining non-selected IQ samples are generally not transmitted.

This opens up for a viable and practical solution for inter-site COMP in modern cellular communication networks. This will also offer the general advantages of COMP such as improved cell edge performance and improved average cell throughput.

For example, the complementary IQ samples may be extracted at the supporting radio base station in a selected subset of the available frequency band, and this subset of the available frequency band is also reserved for a subset of UEs served by the serving radio base station. This subset of UEs preferably corresponds to UEs on the uplink for which the serving radio base station will benefit from receiving complementary IQ samples from the supporting radio base station.

In this context it has been recognized that a user located for example at the cell edge or close thereto can not generally make use of the whole frequency band for uplink transmission so that it would be sufficient to schedule the user on a suitable subset of the frequency band.

In one example, the size of the subset of the frequency band can be dynamically adjusted if the traffic so requires. To obtain the desired bit rate reduction, however, the size of the subset is smaller than the whole available frequency band.

This aspect of the technology disclosed herein is generally applicable to COMP operation in modern cellular networks such as Long Term Evolution (LTE) and Wideband Code Division Multiple Access (WCDMA) networks.

For example, the complementary IQ samples for a subset of the available frequency band may be extracted for a selected subset of available carriers.

As indicated, it is also possible, as a complement or as an alternative to the frequency sub-band selection, to reduce the amount of data to be exchanged over the interface by limiting the number of antennas from which IQ samples are forwarded.

Typically, the complementary IQ samples may be used as a basis for joint decoding and/or interference cancellation. Preferably, the complementary IQ samples are extracted based on received radio signals including at least a radio signal originating from the considered uplink transmission. A reason for using IQ samples is that they are the least "contaminated". IQ samples normally includes information originating from all UEs, both UEs that a radio base station wants to decode and also UEs that may cause interference (and therefore are of interest for interference cancellation).

Any of a wide variety of conventional techniques for joint decoding and/or interference cancellation can be used together with the technology disclosed herein.

It should also be understood that the IQ samples can be time-domain samples and/or frequency-domain samples.

When processing own IQ samples and complementary IQ samples, the serving radio base station typically time-aligns the IQ samples per UE, when required.

In a set of example embodiments, the IQ samples are preferably exchanged by means of multicasting.

By way of example, the supporting radio base station may transmit, via a network interface to a transport network, the complementary IQ samples to a multicast group that includes the serving radio base station. The serving radio base station may join a multicast group for receiving, via a network interface to a transport network, the complementary IQ samples from the supporting radio base station. The complementary IQ samples extracted at the supporting radio base station in the subset of the available frequency band and/or from the subset of the available antennas are associated with the multicast group.

For example, the multicast group may be associated with a cell of the supporting radio base station, and the complementary IQ samples are IQ samples extracted based on received radio signals at the supporting radio base station in the relevant subset of the available frequency band and/or from the relevant subset of the available antennas for this cell.

In this way, there is provided an efficient way of exchanging complementary IQ samples between radio base stations to enable successful decoding of user data. Another benefit is that a supporting radio base station does not need to know how many other radio base stations that are interested in the IQ samples, and that the bit rate of the interface may be reduced as far as possible. In addition, a supporting radio base station only needs to send the data once, although there may be many client radio base stations.

A serving radio base station that wants cooperation from a supporting radio base station joins the appropriate multicast group in order to receive complementary IQ samples from that supporting radio base station.

The use of multicasting for exchanging IQ samples in the context of COMP operation has never been envisaged in the prior art. On the contrary, the state-of-the-art clearly indicates that dedicated interfaces such as the conventional X2 interface for communication between radio base stations should be used for IQ sample exchange, and that the X2 specification would have to be enhanced.

For the frequency sub-band aspect, a multicast group will typically be associated with the IQ samples extracted at the supporting radio base station in the relevant subset of the available frequency band. This subset of the available frequency band is then normally reserved for a subset of UEs on the uplink for which the serving radio base station will benefit from receiving complementary IQ samples from the supporting radio base station.

For a better understanding of the frequency sub-band selection aspect, reference will now be made to an illustrative, non-limiting example, referring to FIGS. 5 and 6.

Figure 5:
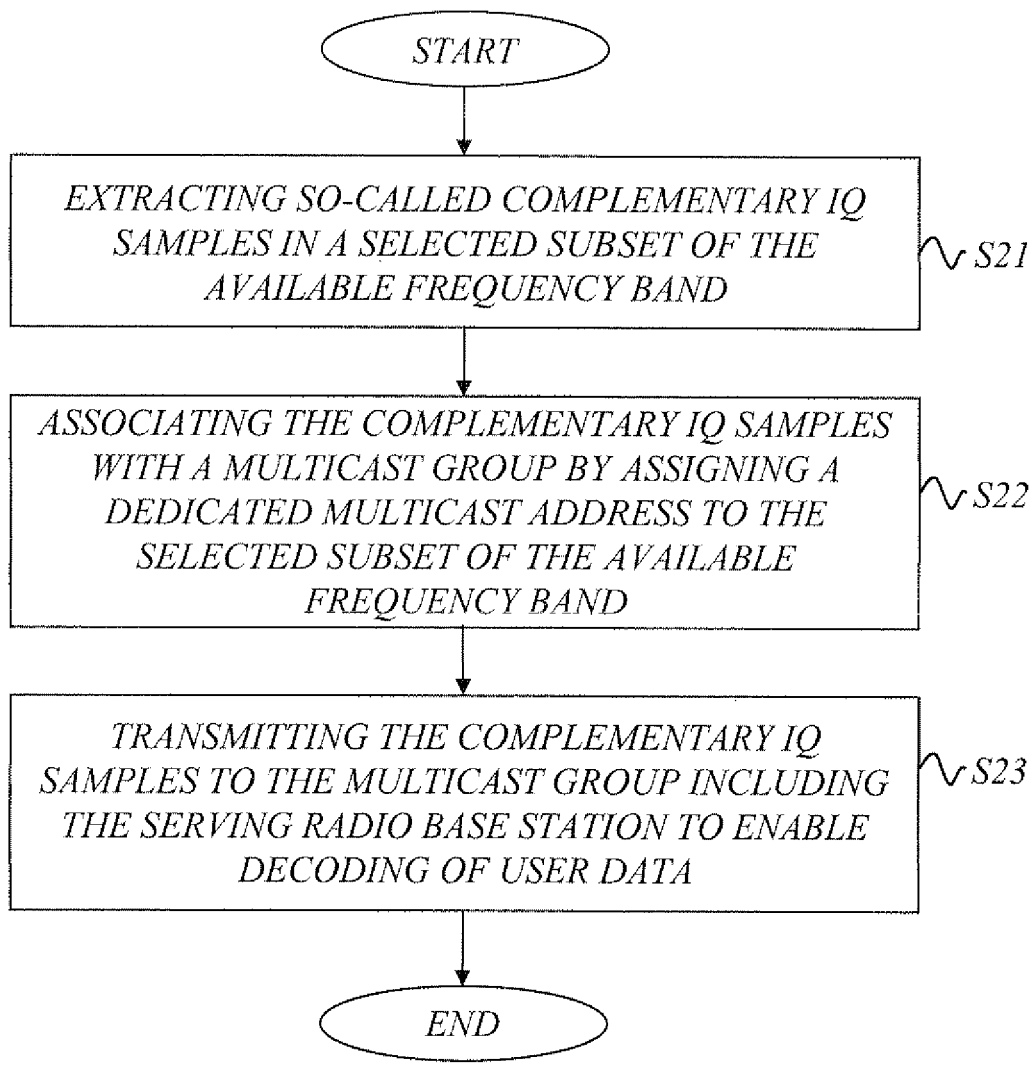
FIG. 5 is a schematic flow diagram illustrating an example of a method for COMP operation for a supporting radio base station according to another illustrative embodiment.

FIG. 5 is a schematic flow diagram illustrating an example of a method for COMP operation for a supporting radio base station according to another illustrative embodiment.

In step S21, the supporting radio base station extracts complementary IQ samples in a selected subset of the available frequency band. In step S22, the supporting radio base station associates the extracted complementary IQ samples with a multicast group by assigning a dedicated multicast address to the selected subset of the available frequency band. In step S23, the supporting radio base station transmits the complementary IQ samples to the multicast group including the serving radio base station to enable decoding of user data.

Figure 6:
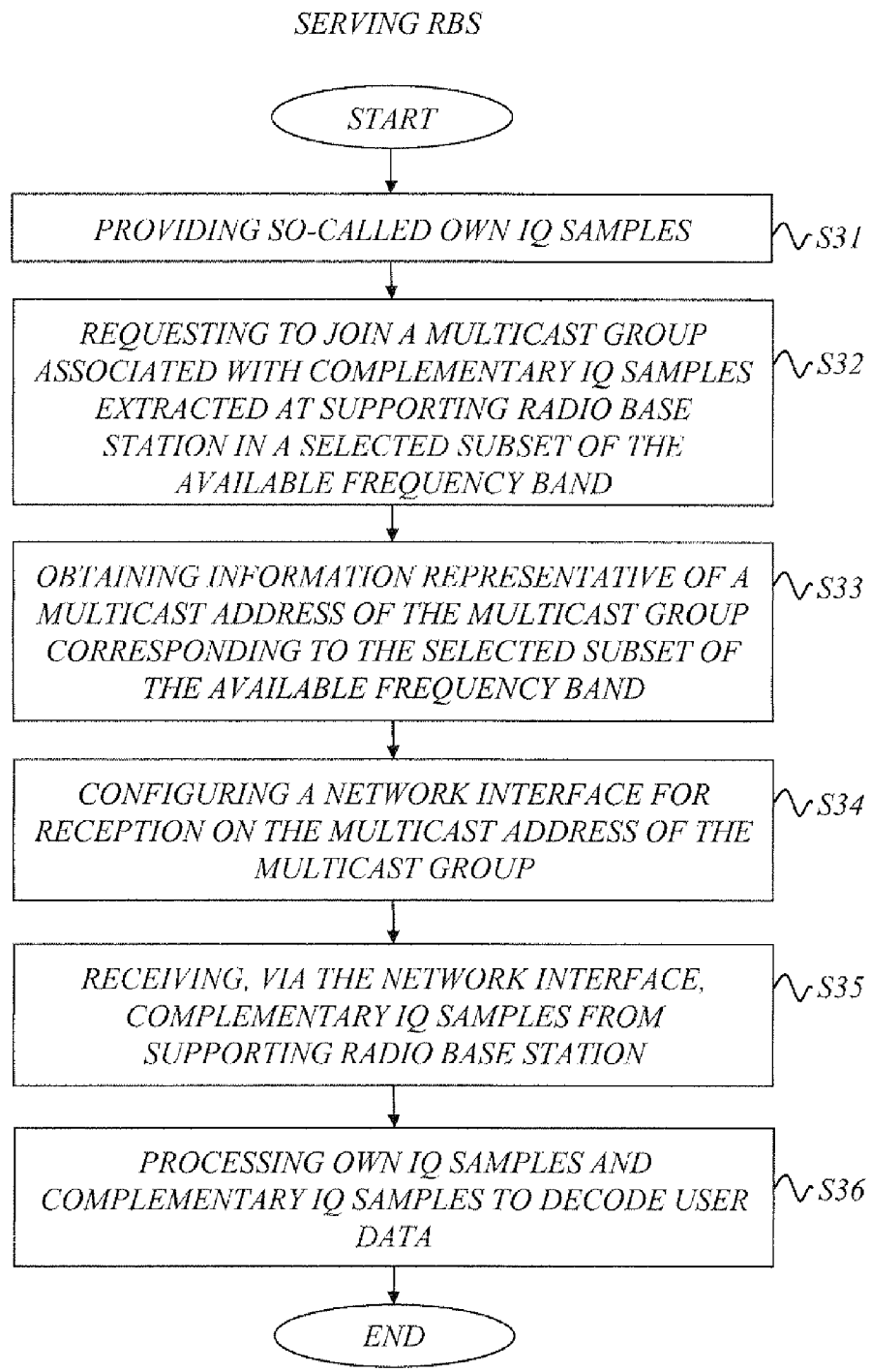
FIG. 6 is a schematic flow diagram illustrating an example of a method for COMP operation for a serving radio base station according to another illustrative embodiment.

FIG. 6 is a schematic flow diagram illustrating an example of a method for COMP operation for a serving radio base station according to another illustrative embodiment.

In step S31, the serving radio base station provides so-called own IQ samples. In step S32, the serving radio base station requests to join a multicast group associated with complementary IQ samples extracted at a supporting radio base station in a selected subset of the available frequency band. In step S33, the serving radio base station obtains information representative of a multicast address of the multicast group corresponding to the selected subset of the available frequency band. In step S34, the serving radio base station configures the network interface for reception on the obtained multicast address of the multicast group. In step S35, the serving radio base station receives, via the network interface to the transport network, the complementary IQ samples from the supporting radio base station. In step S36, the serving radio base station processes the own IQ samples and the received complementary IQ samples to decode user data.

In general, and valid for all embodiments, the serving radio base station may join an additional multicast group for receiving further complementary IQ samples from an additional supporting radio base station over the transport network. Such further complementary IQ samples correspond to received radio signals at the additional supporting radio base station, preferably extracted in a selected subset of the available frequency band and/or from a selected subset of the available antennas, and may be used for joint decoding and/or interference cancellation.

For example, the serving radio base station may determine to join a multicast group based on neighbor list information and/or signal strength measurements.

For example, it is possible to hook this onto the Automatic Neighbour Relations (ANR) feature. The same Domain Name System/Server (DNS) that states the neighbour RBS IP address for X2 based on cell ID could provide the multicast group and multicast address for the cell.

Figure 7:
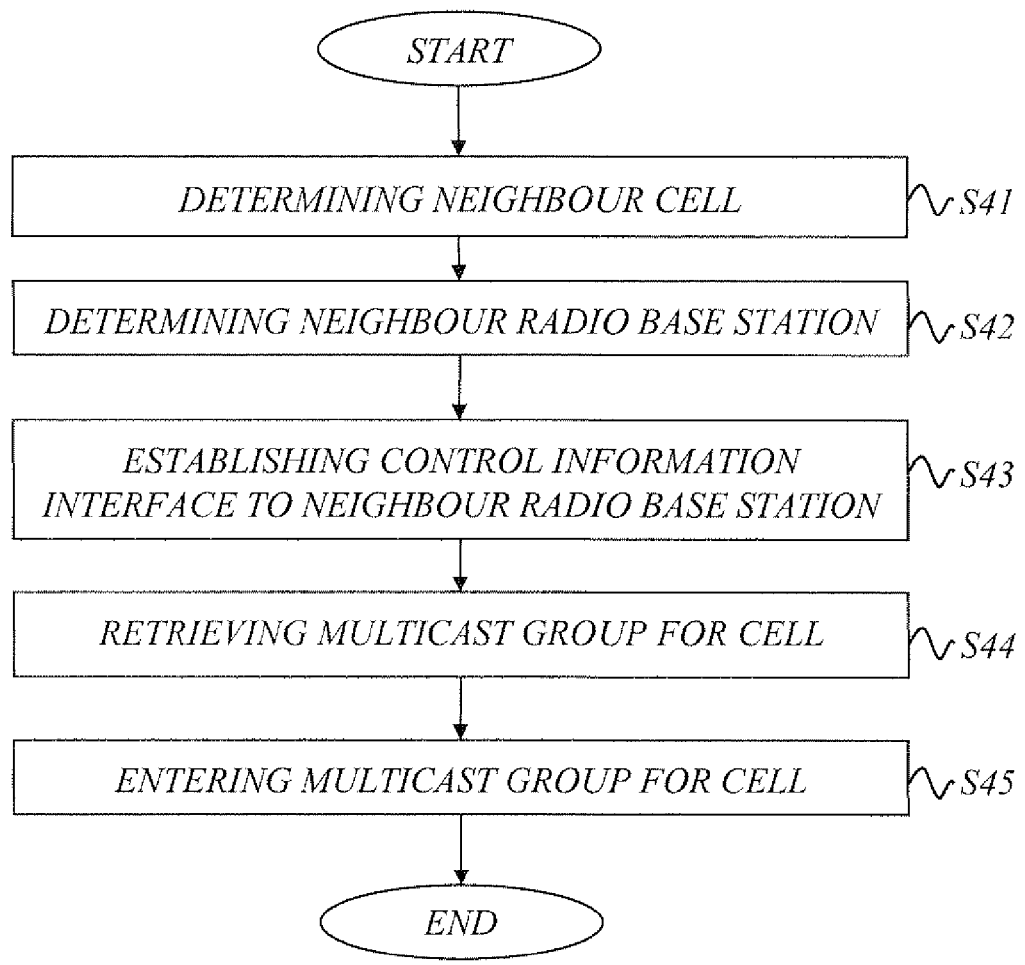
FIG. 7 is a schematic flow diagram illustrating an example of a method for determining neighbour(s) and joining a multicast group according to an illustrative embodiment.

FIG. 7 is a schematic flow diagram illustrating an example of a method for determining neighbour(s) and joining a multicast group according to an illustrative embodiment. In step S41, the serving radio base station determines neighbour cell(s), and in step S42 associated neighbour radio base station(s) are determined. This may e.g. be done by using a conventional ANR request/report and a DNS query/lookup. The serving radio base station then establishes a control information interface to the desired neighbour radio base station(s) in step S43. This interface can e.g. be the conventional X2 interface. The serving radio base station may then ask the neighbour radio base station which multicast group(s) that is/are available, and retrieve the multicast address of the appropriate multicast group for a considered cell over this control information interface in step S44. The serving radio base station may then enter the relevant multicast group in step S45.

It can be determined whether an RBS is interested to subscribe to IQ samples from another RBS, for example based on one or more of the following:

The cell plan. The operator can configure this.

The reported neighbour cells by a UE. The measurement reports from a UE which would benefit from a COMP may be used to determine which cells to subscribe to. The UE is typically a weak UE.

A UE having problems with the UL can be scheduled on the frequency which is forwarded from a probable COMP cell. The UE, or its interferer, is looked for in the samples received. If not found, another frequency, belonging to another cell, can be tried. If none of the frequencies is better than the other, the user will not benefit from COMP, at this stage.

For WCDMA, the multicast group to enter could for example be determined beforehand, at cell planning, or determined by the Radio Network Controller (RNC).

It should also be understood that a multicast group normally includes a number of radio base stations. For example, the supporting radio base station will be transmitting complementary IQ samples to a multicast group that also includes an additional serving radio base station to enable this additional serving radio base station to decode user data of an uplink transmission of at least one UE served by the additional serving radio base station based on the complementary IQ samples together with own IQ samples provided by the additional serving radio base station.

For example, a supporting radio base station may have a number of cells, and for each cell the supporting radio base station may have one or more multicast groups for respective parts of the frequency band. A dynamic or configured portion of each cell can be distributed to interested RBS(s), as will be explained in more detail later on.

Figure 8:
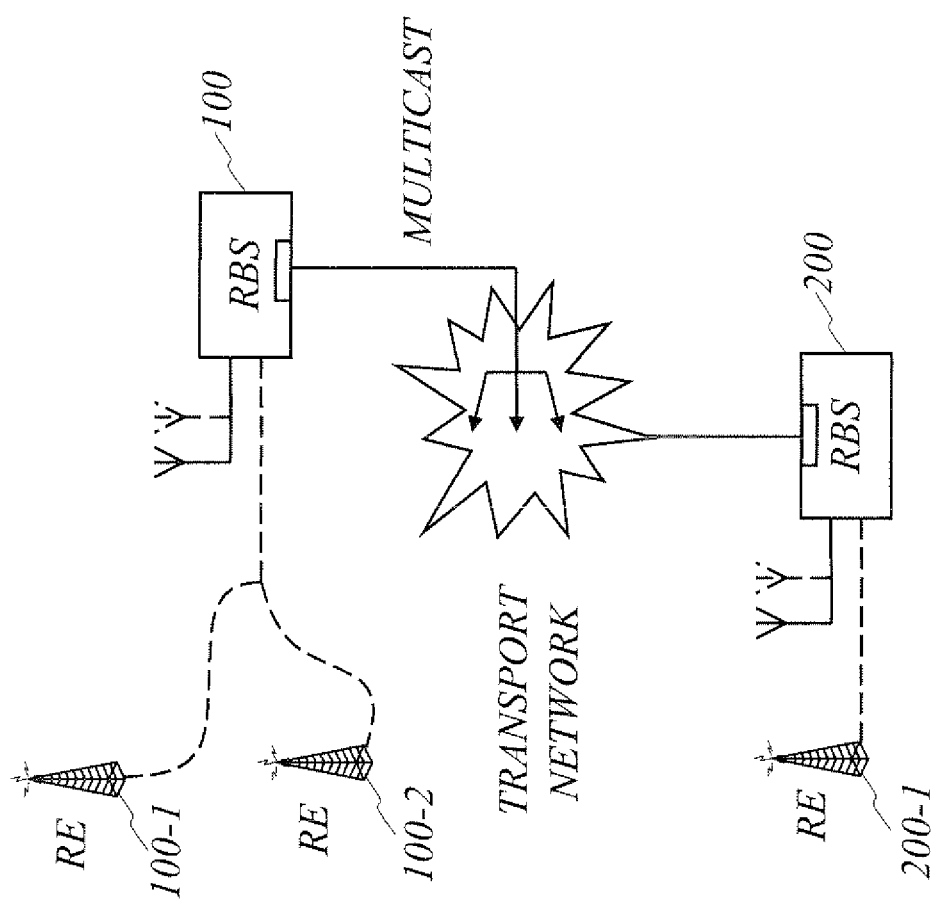
FIG. 8 is a schematic diagram illustrating an example of radio base stations interconnected through a transport network and configured for exchanging IQ samples by multicast according to an illustrative embodiment.

FIG. 8 is a schematic diagram illustrating an example of radio base stations interconnected through a transport network and configured for exchanging IQ samples by multicast according to an illustrative embodiment. In this example, a radio base station (RBS) 100 receives radio signals on its antenna(s) and/or one or more optional remote radio equipment (RE) units 100-1 and 100-2 such as remote radio heads, and provides IQ samples based on the received radio signals. The RBS 100 may of course process IQ samples for decoding user data on its own, but it may also acts as a so-called supporting radio base station in COMP operation to transfer IQ samples to another so-called serving radio base station (RBS) 200 to assist in the decoding of user data there. In this example, the supporting RBS 100 transmits the so-called complementary IQ samples by multicasting over a transport network. The IQ samples are transmitted, via a network interface to the transport network, to a multicast group that includes the other RBS 200. The RBS 200 is also configured to receive radio signals on its antenna(s) and/or one or more optional remote radio equipment (RE) units 200-1, and provide its own IQ samples. The RBS 200 joins the relevant multicast group to be able to receive the complementary IQ samples from the supporting RBS 100. The RBS 200 may then decode user data by processing own IQ samples together with the complementary IQ samples received over the transport network.

It should be noted that an RBS may at the same time be a Serving RBS for some UEs and a supporting COMP RBS for other UEs. In a system-wide context, it is proposed to configure each RBS to forward at least parts of its UL samples onto the transport network. The samples are tagged with a multicast group tag, and all RBSs interested in receiving the UL samples will join the multicast group, and receive the samples.

For example, it could be possible to use COMP as a coverage extension for low and middle bit rate users, in large cells, with a target to make COMP work for inter-site distances in the range of up to 50 km.

It should be understood that any of a number of conventional multicast techniques may be used with the technology disclosed herein. For example, the multicast group may be a Virtual Local Area Network (VLAN) group or an Internet Protocol (IP) multicast group, and the transport network may be e.g. an Ethernet network or any other suitable transport network.

The transport network connects the radio base stations. Typically, the transport network is Ethernet based. The transport network then normally includes a number of switches to aggregate the traffic. The technology disclosed herein may utilize the fact that the switches normally support port-port switching within the leaf part of the network. More specifically, the switches support broadcast within a VLAN, and multiple VLANs can typically be present on the same port.

By way of example, the multicast may be implemented as a broadcast within a Virtual Local Area Network (VLAN), IQ samples are packaged into Ethernet packets and transmitted as broadcast on the multicast address, where each of the complementary IQ samples are tagged with an associated multicast group tag.

The transport network, e.g. based on Ethernet switches, will combine the flows from different RBSs and give a single interface to each RBS for all its neighbours.

IP multicast is another method, which allows sending of IP datagrams to a group of interested receivers in a single transmission.

The process of joining a multicast group is typically based on retrieving a multicast address corresponding to the multicast group of interest and configuring the network interface for reception on that multicast address.

For example, it is possible to use an Ethernet adapter that specifically enables a given multicast address for reception.

Figure 10:
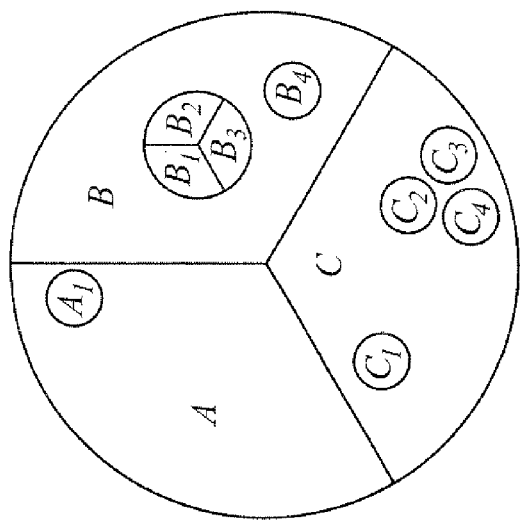
FIG. 10 is a schematic diagram illustrating another example of a hierarchical arrangement of cells in a cellular communication network.
Figure 9:
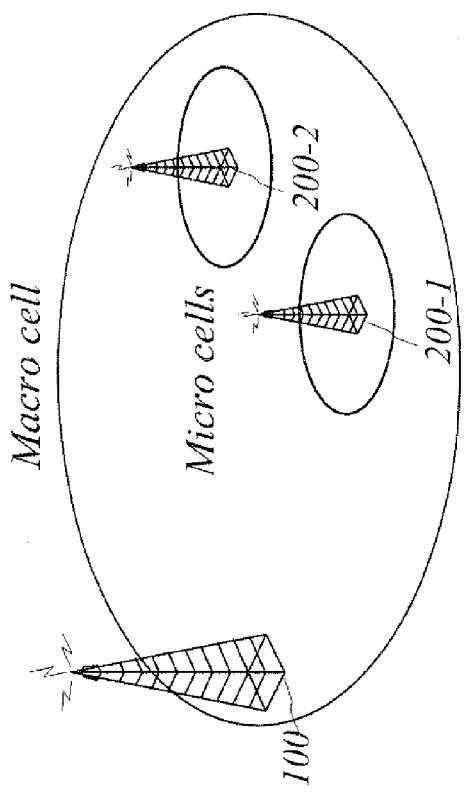
FIG. 9 is a schematic diagram illustrating an example of a hierarchical communication network.

In a set of example embodiments, the supporting radio base station and the serving radio base station are managing cells on different levels in a hierarchical cellular network, as exemplified in FIGS. 9 and 10.

FIG. 9 is a schematic diagram illustrating an example of a hierarchical communication network. In this relatively simple example, there is a macro cell under the control of a radio base station 100, and micro cells under the control of respective radio base stations 200-1 and 200-2.

The RBSs 200-1, 200-2 for the micro cells may want to have assistance data from the corresponding macro cell, as the macro cell antennas of the radio base station 100 will detect signal energy from the UEs in the micro cells, but also since the macro cell antennas will detect the interference also seen by the micro cell antennas. The data received from the macro cell antennas will thus allow a micro cell RBS to do a better detection and better interference cancellation.

In this kind of deployment the supporting macro RBS 100 normally has many potential serving micro RBSs 200 requesting assistance. To decrease the total bit rate sent out from the macro RBS 100, multicast on the transport network is utilized. In a particular example, the multicast is implemented as a broadcast within a VLAN, where serving micro RBSs enters the VLAN of the macro cell in order to further decrease the control signaling between the RBSs.

The number of RBSs listening can be substantial in a heterogeneous network, where all micro RBSs are interested in listening to the UL IQ samples of the macro cell it resides under. In such a case, the cost for multicasting a large portion of the received signal of the macro RBS can be motivated.

In the above example, the macro RBS 100 acts as a supporting COMP radio base station and the micro RBSs are respective serving radio base stations. However, it should be understood that there may in principle be cases where a micro RBS may act as a supporting RBS for a serving macro RBS.

FIG. 10 is a schematic diagram illustrating another example of a hierarchical arrangement of cells in a cellular communication network. Within an overall macro coverage area, smaller micro, pico, and possibly femto cells can be deployed. In this particular example, three underlying sectors A, B and C provides macro coverage. In sector A, for example, a smaller single-sector cell A1 is deployed. In sector B, the sector cells B1-B3, and single-sector cell B4 are deployed. In sector C, cells C1-C4 are deployed.

The macro coverage area may be managed by one or more radio base stations. For example, if the entire macro coverage area is managed by a single radio base station, this radio base station (not shown in FIG. 10) may associate each sector A, B, C with a respective multicast group and a radio base station on a lower hierarchical level may join the appropriate multicast group to receive assistance data in the form of complementary IQ samples from the macro radio base station. For example, a radio base station responsible for micro/pico/femto cell B4 may join a multicast group associated with sector B to receive IQ samples extracted from radio signals received in sector B by the macro radio base station.

This type of operation may be combined with the selection of part of the frequency band and/or part of the available antennas to provide further bit rate savings. For example, a macro cell may be operated at 100 MHz, while a micro cell is operated at 10 MHz, and then it may be desirable to extract and transfer only those IQ samples that are within the relevant frequency band.

The cellular network may look very different in different regions. This is one of the reasons for the need of flexibility of the COMP interconnect and configuration.

As an example, a normal hexagon network plan may be considered with a three sector RBS. In such a configuration, each RBS serves three sectors, each typically having one cell. Each cell is surrounded by six other cells, of which two belongs to the same RBS. Each RBS is surrounded by six other RBSs, of which nine cells are neighbouring the own cells. There may also exist other cells added due to hot spot or white spot. A three sector RBS may actually be two or three separate RBSs on the same site, due to limited capacity per RBS. Each RBS may be built up using one or more boards, which may have the cells split between them—each board does not necessarily have the same information about the own RBS antennas, and may not be interested in all the neighbour cells.

Each RBS may be allowed to use the complete frequency band for its transmissions. For UL, it can be a good idea to limit the use of the part distributed to the neighbour RBSs, so this is primarily used for cell-edge users, in both the own and the neighbouring cells.

Figure 11:
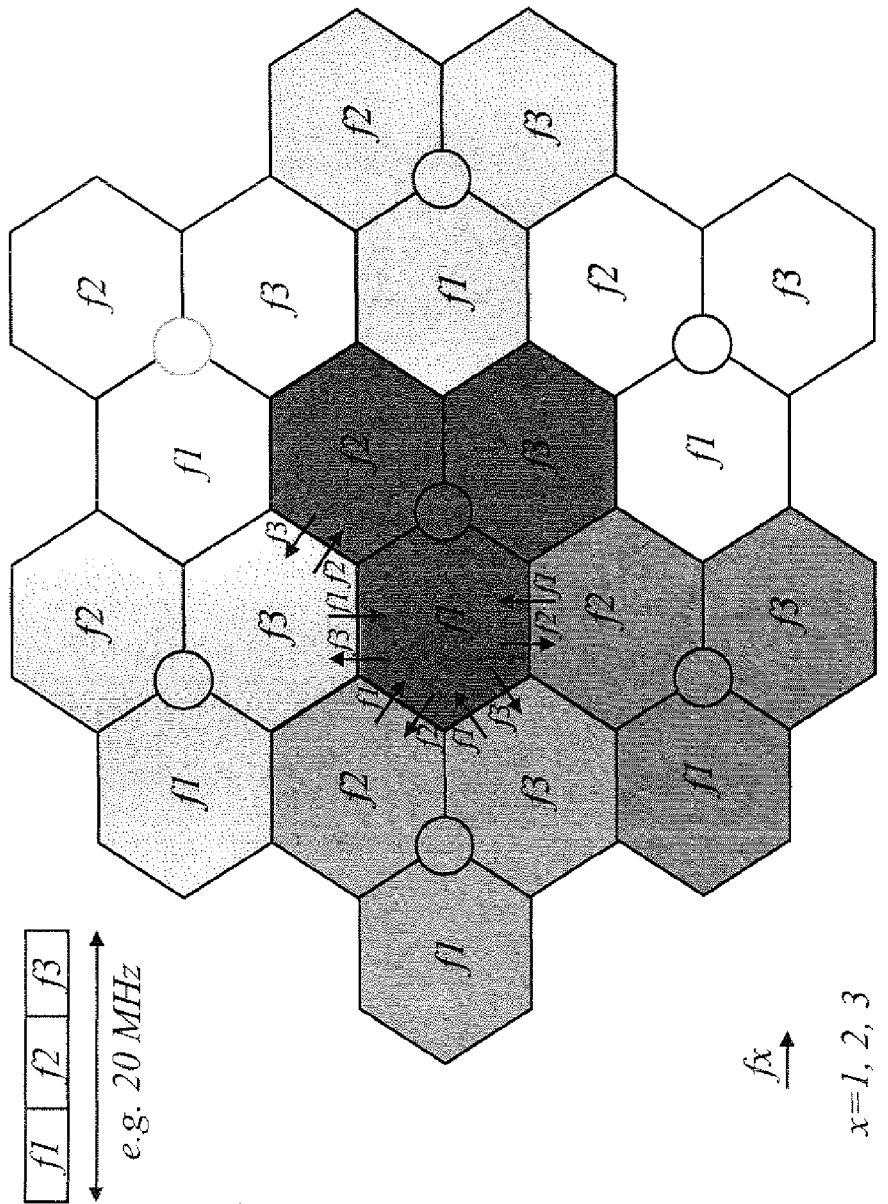
FIG. 11 is a schematic diagram illustrating an example of a cell structure in which IQ samples related to only a part of the available frequency band are transmitted from one radio base station to another radio base station according to a frequency reuse plan.

FIG. 11 is a schematic diagram illustrating an example of a cell structure in which IQ samples related to only a part of the available frequency band are transmitted from one radio base station to another radio base station according to a frequency reuse plan.

In a particular example, the supporting radio base station may associate each of a number of cells with one or more multicast groups and extract, for each cell-associated multicast group, complementary IQ samples in a respective subset of the available frequency band for the associated cell, and transmit, via the network interface to the transport network, the complementary IQ samples in the respective subset of the available frequency band to the associated multicast group.

It should also be understood that a multicast group normally includes a number of radio base stations.

In the example illustrated in FIG. 11, a number of radio base stations are arranged to provide an overall cell structure. For example, each radio base station (indicated by small circles) may employ directional sector antennas. In case of N sector antennas on the same radio base station site, each with a different direction, the radio base station site can serve N different sectors, for simplicity also referred to as cells. N is typically 3. It is also possible to use omni-directional antennas, with a radio base station located in the middle of each cell.

To further save bit rate on the transport network interface, only part of the frequency band in each sector/cell is published on the multicast, and optionally also only part of the antennas. Typically, a 1/K reuse is used for the part of the frequency band in the sectors/cells, where K may be an integer such as K=3. Each cell/sector has 1/K of the frequency band reserved for a set of UEs, and receives complementary IQ samples for the uplink for that 1/K of the frequency band from one or more neighboring supporting radio base stations. Similarly, each cell/sector transmits IQ samples for L/K of the frequency band to neighbouring radio base stations. The number L may e.g. depend on the cellular topology and is by way of example in the range 2-3. For the example when K=3 and L=2, ⅓ (1/K) of the frequency band is reserved for each cell/sector and the radio base station receives IQ data for that ⅓ of the frequency band for each cell/sector, and transmits ⅔ (L/K) of its received IQ data for each cell/sector to other radio base stations. It is also possible to relate L to K such that for example L=K−1.

Each cell is normally informed about what part (e.g. ⅓) of the frequency band it can fetch from neighbour RBSs. For example, the RBS then schedules UEs on the cell border to these frequencies.

The UL IQ samples received from the radio is typically fed through a number of filters. Each filter extracts a respective part of the frequency band. The extracted part is fed onto an interface to the RBS(s) interested in that part of the frequency band.

By way of example, consider the radio base station in the middle of the cell structure. This radio base station has three sector/cells, each of which has a specific part of the frequency band (f1/f2/f3) reserved for a set of UEs (e.g. weak UEs at the cell borders) on the uplink. For the sector/cell with the subset f1 of the frequency band reserved, this sector/cell will benefit from receiving complementary IQ samples from one or more neighbouring sectors/cells (and corresponding neighbouring radio base stations) in this specific part f1 of the frequency band. Similarly, the f1 sector/cell of the radio base station in the middle will be a neighbouring sector/cell to the f2/f3 sectors/cells of other neighbouring radio base stations, and therefore it will be beneficial to transfer IQ samples in these parts f2/f3 of the frequency band to neighbouring radio base stations. The arrows in FIG. 11 indicate uplink IQ sample flows for frequency band fx, where x=1, 2 or 3. The corresponding fx located in the center of each sector/cell represents the part of frequency band for which the sector/cell will benefit from receiving complementary IQ samples from one or more neighbouring radio base stations.

In an extension, the cellular structure of the radio access network is preferably exported to the transport network by allocating at least one multicast group to each cell in the relevant parts of the cellular network.

In a particular example, the IQ samples can be packaged into Ethernet packets, and use (VLAN) broadcast to save BW. Each part (e.g. ⅓) of the bandwidth of a cell is given a multicast group (VLAN) address. The UL IQ samples are transmitted as broadcast on that address. RBSs interesting in receiving such data enter the group.

Figure 12:
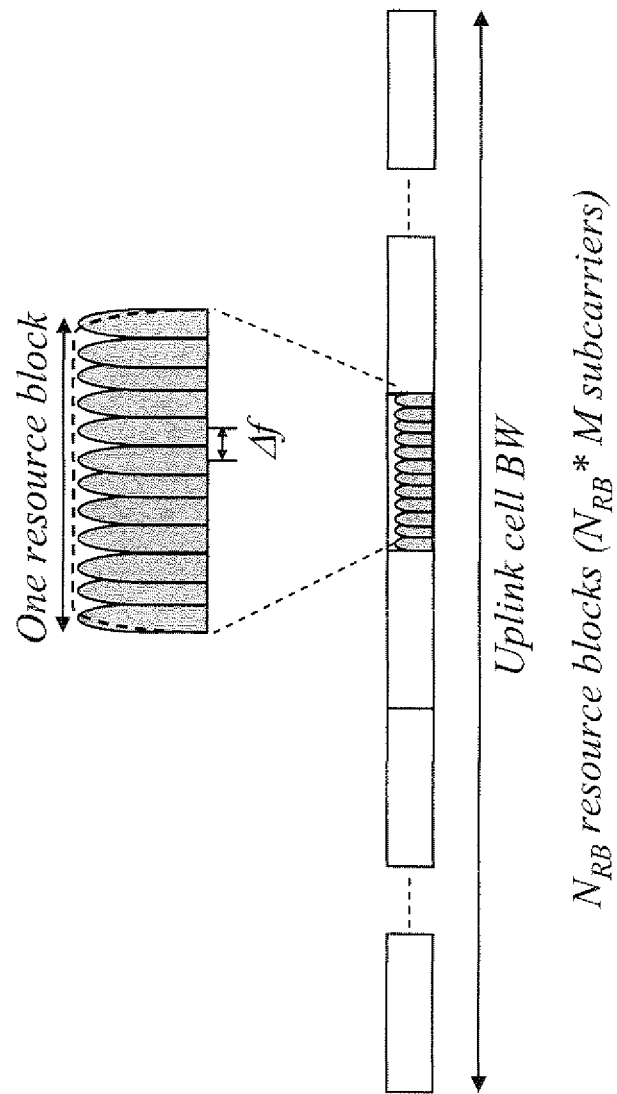
FIG. 12 is a schematic diagram illustrating an example of flexible bandwidth configuration and the relation to the number of resource blocks that can be assigned to user equipment (UE) for uplink transmission.

FIG. 12 is a schematic diagram illustrating an example of flexible bandwidth configuration and the relation to the number of resource blocks that can be assigned to user equipment (UE) for uplink transmission. This is merely an example, valid to for example LTE uplink transmission. Each resource block includes a number M of subcarriers, with a subcarrier spacing $\Delta f$. The uplink cell bandwidth can then be defined as $N_{RB}$ resource blocks. This illustrates an example of the frequency-domain structure for the uplink. For the LTE uplink, for example, M is usually 12 and the subcarrier spacing equals 15 kHz. LTE physical-layer specification allows for, in essence, any number of uplink resource blocks (although typically ranging from a minimum of 6 resource blocks up to a maximum of 110 resource blocks) to cater for a high degree of flexibility in terms of the overall cell bandwidth.

The technology disclosed herein is also applicable for WCDMA. WCDMA typically operates based on multiple WCDMA carriers. For example, a radio base station may operate on 4 WCDMA carriers using the same radio unit. Each UE may use one of the WCDMA carriers as an anchor carrier but may be ordered to transmit or receive also on other WCDMA carriers, so called multi-carrier operation.

For example, the extracted subset of the total received frequency band may in a particular example include one or possibly more WCDMA carriers. The case of a radio base station serving 3 WCDMA carriers may be illustrated by FIG. 11, with the interpretation that fx indicates WCDMA carrier x. In the illustrative example of FIG. 11, each cell may e.g. select one WCDMA carrier to be used for weak UEs, and receives complementary IQ samples from RBSs with neighbouring cells.

The technology disclosed herein can also be applied for the downlink (DL), as will be explained in the following with reference to the flow diagrams of FIGS. 13 and 14.

Figure 13:
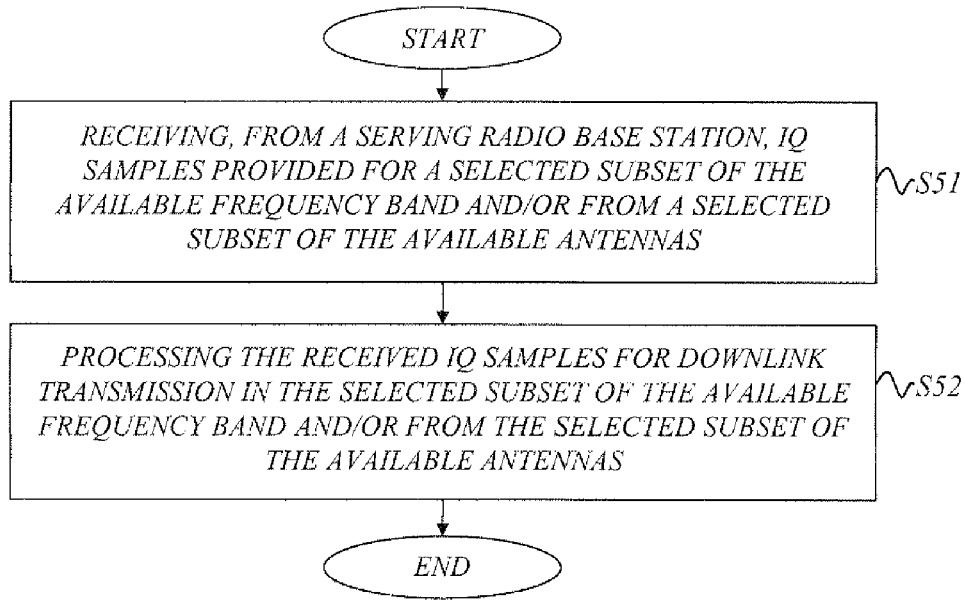
FIG. 13 is a schematic flow diagram illustrating an example of a method for COMP operation for the downlink for a supporting radio base station according to an illustrative embodiment.

FIG. 13 is a schematic flow diagram illustrating an example of a method for COMP operation for the downlink for a supporting radio base station according to an illustrative embodiment.

In step S51, the supporting radio base station receives, from a serving radio base station, In-phase and Quadrature-phase (IQ) samples provided for a selected subset of the available frequency band and/or a selected subset of the available antennas. These IQ samples correspond to a downlink transmission intended for at least one UE. In step S52, the supporting radio base station processes the received IQ samples for downlink transmission in the selected subset of the available frequency band and/or from the selected subset of the available antennas.

Figure 14:
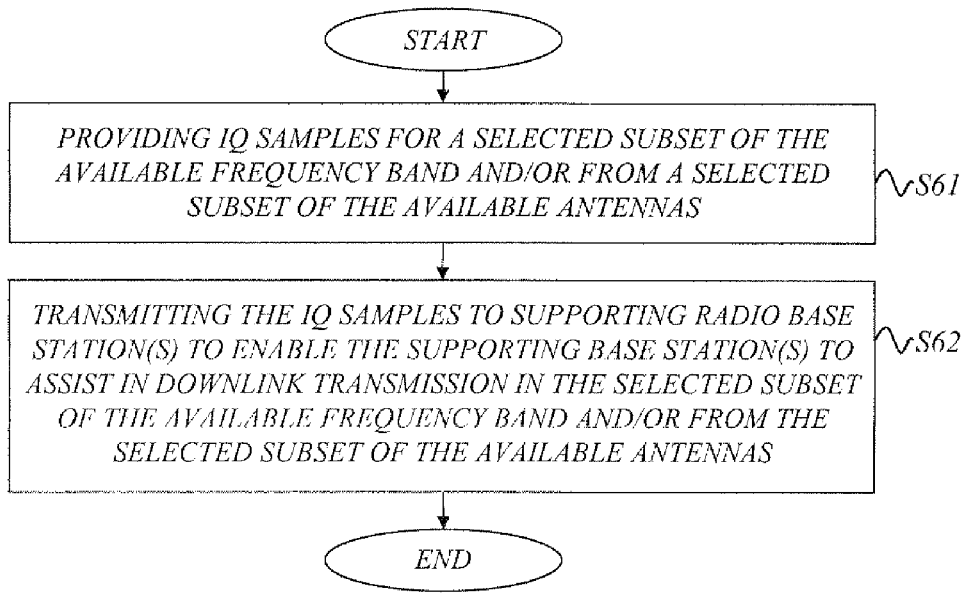
FIG. 14 is a schematic flow diagram illustrating an example of a method for COMP operation for the downlink for a serving radio base station according to an illustrative embodiment.

FIG. 14 is a schematic flow diagram illustrating an example of a method for COMP operation for the downlink for a serving radio base station according to an illustrative embodiment.

In step S61, the serving radio base station provides In-phase and Quadrature-phase (IQ) samples for a selected subset of the available frequency band and/or a selected subset of the available antennas. The IQ samples correspond to a downlink transmission intended for at least one UE. In step S62, the said serving radio base station transmits, to at least one supporting radio base station, the IQ samples to enable the supporting radio base station(s) to assist in the downlink transmission in the selected subset of the available frequency band and/or from the selected subset of the available antennas.

If desired, the supporting radio base station may use a larger set of antennas for the actual downlink transmission.

Figure 15:
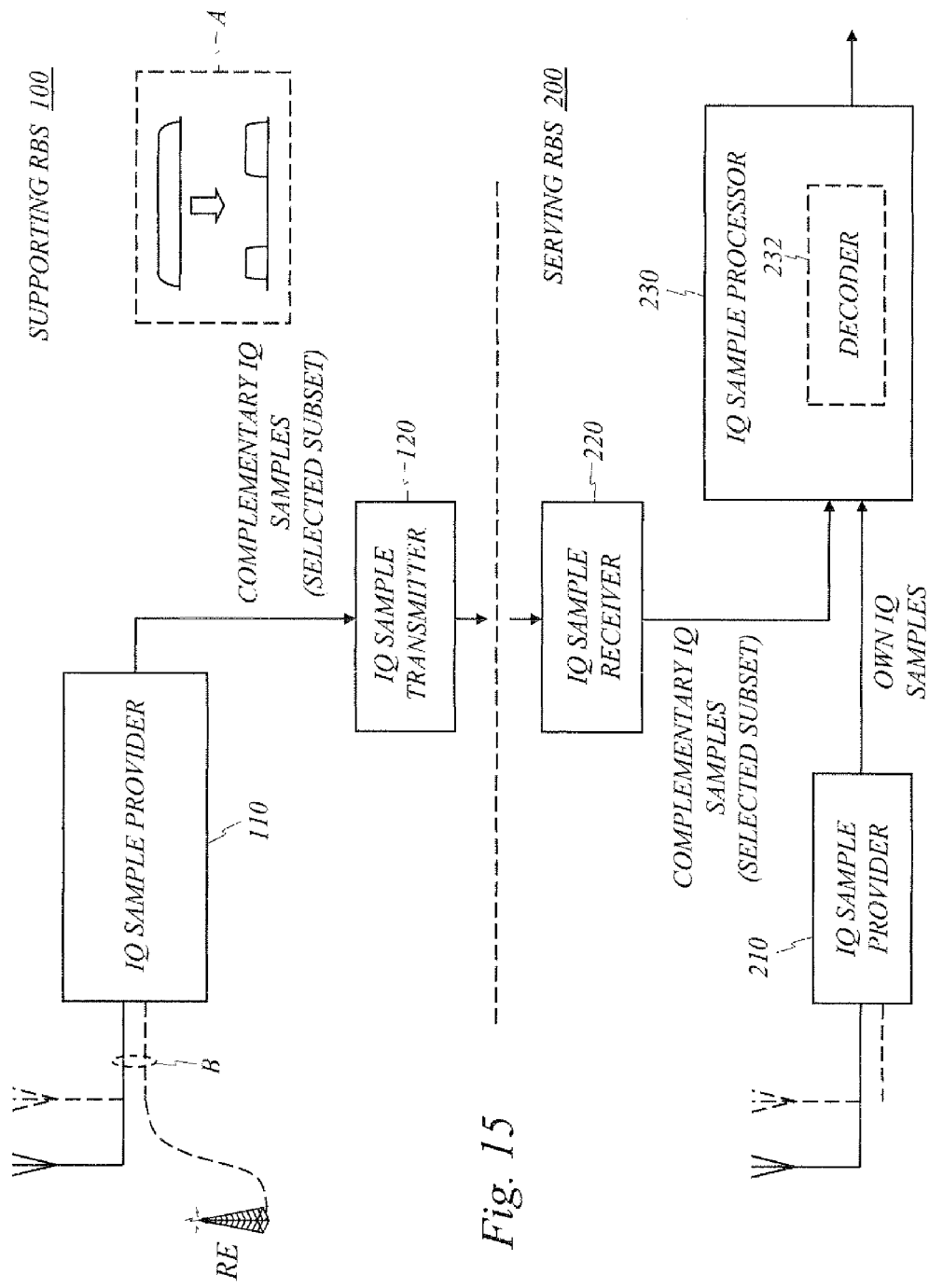
FIG. 15 is a schematic block diagram illustrating an example of a supporting radio base station and a serving radio base station, respectively, configured for COMP operation according to an illustrative embodiment.

FIG. 15 is a schematic block diagram illustrating an example of a supporting radio base station and a serving radio base station, respectively, configured for COMP operation according to an illustrative embodiment.

The supporting radio base station (RBS) 100 comprises an In-phase and Quadrature-phase (IQ) sample provider 110 configured to extract, in a selected subset of the available frequency band (A) and/or from a selected subset of the available antennas (B), IQ samples, referred to as complementary IQ samples, based on received radio signals including a radio signal originating from an uplink transmission of at least one UE served by the serving radio base station 200. The supporting radio base station 100 further comprises an IQ sample transmitter 120 configured to transmit the complementary IQ samples to the serving radio base station 200 to enable the serving radio base station to decode user data of the uplink transmission based on the complementary IQ samples together with own IQ samples provided by the serving radio base station.

As illustrated in the dashed square denoted by A in FIG. 15, the IQ sample provider 110 may select a suitable part or subset of the frequency band of the receiver and extract IQ samples for this subset. For example, the IQ sample provider 110 may be configured to extract the complementary IQ samples only for a selected subset of the available carriers.

The supporting RBS 100 may also have several antennas and/or optionally also remote radio equipment (RE) units. As illustrated by the dashed circle denoted by B, the IQ sample provider 110 may as an alternative or as a complement select a suitable subset of the antennas and extract IQ samples only for the selected subset of antennas.

This will provide significant savings of bit rate for the exchange of IQ samples between the radio base stations.

Similarly, the serving radio base station (RBS) 200 comprises an In-phase and Quadrature-phase (IQ) sample provider 210 configured to provide IQ samples, referred to as own IQ samples, based on received radio signals including a radio signal originating from an uplink transmission of at least one UE. The serving radio base station 200 further comprises an IQ sample receiver 220 configured to receive, from the supporting radio base station 100, complementary IQ samples extracted based on received radio signals at the supporting radio base station 100 in a selected subset of the available frequency band and/or from a selected subset of the available antennas. The serving radio base station 200 also comprises an IQ sample processor 230 configured to process the own IQ samples and the complementary IQ samples to decode user data of the uplink transmission. The IQ sample processor 230 thus includes a general decoder 232.

Well-known standard circuitry including basic transmission/reception circuitry and standard processing capabilities of a radio base station will not be described, unless for its relevance to COMP operation of the technology disclosed herein.

It is also possible to combine the above features with the multicast feature for transferring IQ samples via a suitable transport network.

Figure 16:
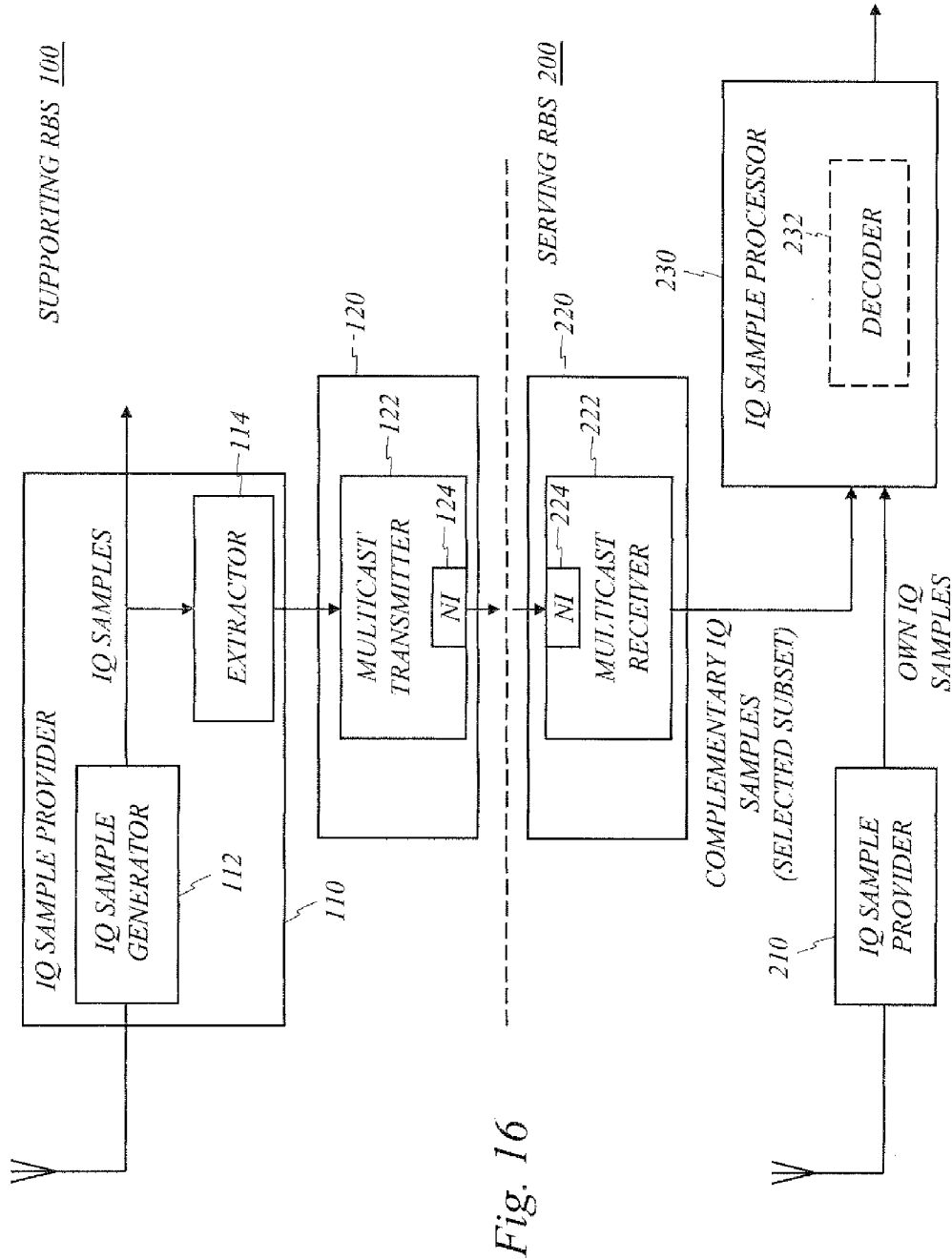
FIG. 16 is a schematic block diagram illustrating an example of a supporting radio base station and a serving radio base station, respectively, configured for COMP operation according to another illustrative embodiment.

FIG. 16 is a schematic block diagram illustrating an example of a supporting radio base station and a serving radio base station, respectively, configured for COMP operation according to another illustrative embodiment.

In this example, the IQ sample provider 110 of the supporting RBS 100 comprises an IQ sample generator 112, and also an extractor 114 configured to extract complementary IQ samples in a selected subset of the available frequency band and/or from a selected subset of the available antennas. For example, the extractor 114 may be configured to extract complementary IQ samples for a selected subset of available carriers.

In this particular example, the IQ sample transmitter 120 comprises a multicast transmitter 122 configured to transmit, via a network interface 124 to a transport network (TN), the complementary IQ samples to a multicast group that includes the serving RBS 200 to enable the serving RBS to decode user data of the uplink transmission based on the complementary IQ samples together with own IQ samples. The complementary IQ samples extracted at the supporting RBS in the selected subset of the frequency band and/or from the selected subset of the antennas being associated with the multicast group.

Similarly, in this particular example, the IQ sample receiver 220 of the serving RBS 200 comprises a multicast receiver 222 configured to join a multicast group for receiving, via a network interface 224 to the transport network (TN), the complementary IQ samples from the supporting RBS 100.

The multicast group may be associated with a cell of the supporting radio base station, and in that case the IQ sample provider 110 is configured to extract the complementary IQ samples based on received radio signals at the supporting radio base station for that cell.

The supporting radio base station 100 is preferably configured for associating the complementary IQ samples extracted in a selected subset of the available frequency band with a multicast group by assigning a dedicated multicast address to the considered subset of the available frequency band.

The bit rate saving provided by the multicast feature allows more data to be output from the supporting RBS, even in the case of multiple serving RBSs. The multicast may also save costs in the interface adaptation due to less hardware being required.

Figure 17:
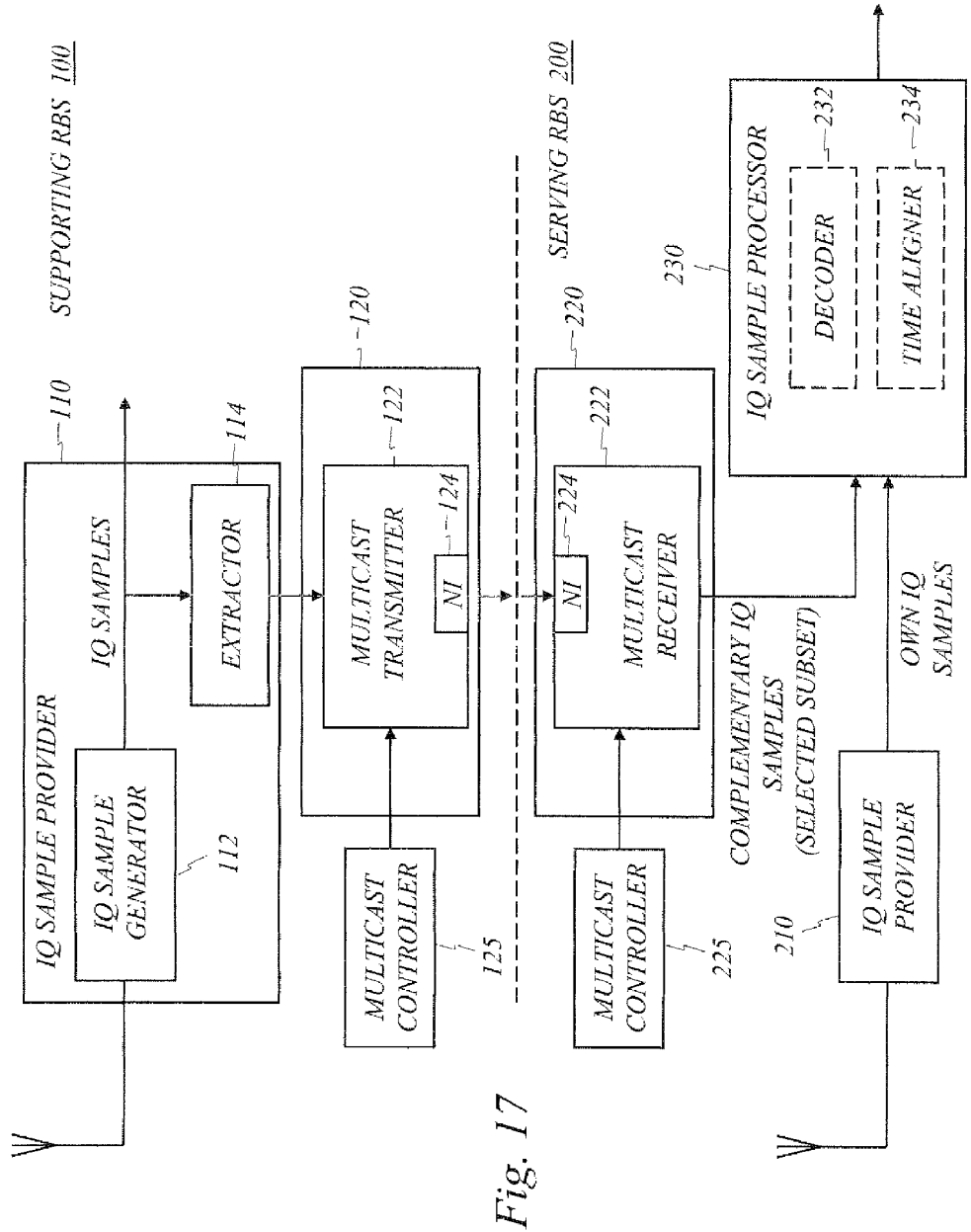
FIG. 17 is a schematic block diagram illustrating an example of a supporting radio base station and a serving radio base station, respectively, configured for COMP operation according to yet another illustrative embodiment.

FIG. 17 is a schematic block diagram illustrating an example of a supporting radio base station and a serving radio base station, respectively, configured for COMP operation according to yet another illustrative embodiment. In this example, the supporting radio base station 100 comprises a multicast controller 125, which may be located separate from, but interconnected with the multicast transmitter 122, or alternatively integrated with the multicast transmitter 122. The multicast controller 125 controls the operation/configuration of the multicast transmitter 122, and may also be responsible for communicating with other radio base stations wanting to join a multicast group.

Similarly, the serving radio base station 200 comprises a multicast controller 225, which may be located separate from, but interconnected with the multicast receiver 222, or alternatively integrated with the multicast receiver 222. The multicast controller 225 of the serving RBS 200 is preferably configured for requesting to join a multicast group, for obtaining a corresponding multicast address, and for configuring the network interface 224 for reception on the multicast address of the multicast group.

For the case, when the multicast group is associated with IQ samples extracted at the supporting RBS 100 in a selected subset of the available frequency band, the RBS 100 and more particularly the multicast controller 125 may associate the complementary IQ samples with the multicast group by assigning a dedicated multicast address to the relevant subset of the frequency band. Typically, the selected subset of the available frequency band is also reserved for a subset of UEs served by the serving radio base station 200. This may for example be a subset of UEs on the uplink for which the serving radio base station 200 will benefit from receiving complementary IQ samples from the supporting radio base station 100.

The multicast controller 225 of the serving RBS 200 is then configured for requesting to join the multicast group and for obtaining information representative of the multicast address assigned to the multicast group corresponding to this subset of the available frequency band, and for configuring the network interface 224 for reception on this multicast address.

By way of example, the supporting RBS 100 may be configured to associate each of a number of cells with at least one multicast group and the IQ sample provider 110 is configured to extract, for each of the multicast group(s), complementary IQ samples in a respective subset of the available frequency band. The multicast transmitter 122 is then configured to transmit, via the network interface 124 to the transport network, the complementary IQ samples in the respective subset of the available frequency band to the associated multicast group.

The radio base stations may thus be configured for operation in a cellular structure similar to that of FIG. 11.

The serving radio base station 200 may be configured for determining to join a multicast group based on neighbor list information and/or signal strength measurements, e.g. as previously discussed.

Further, the IQ sample processor 230 of the serving RBS 200 optionally comprises a time aligner 234 for time-aligning own IQ samples and complementary IQ samples per UE, when required.

Figure 18:
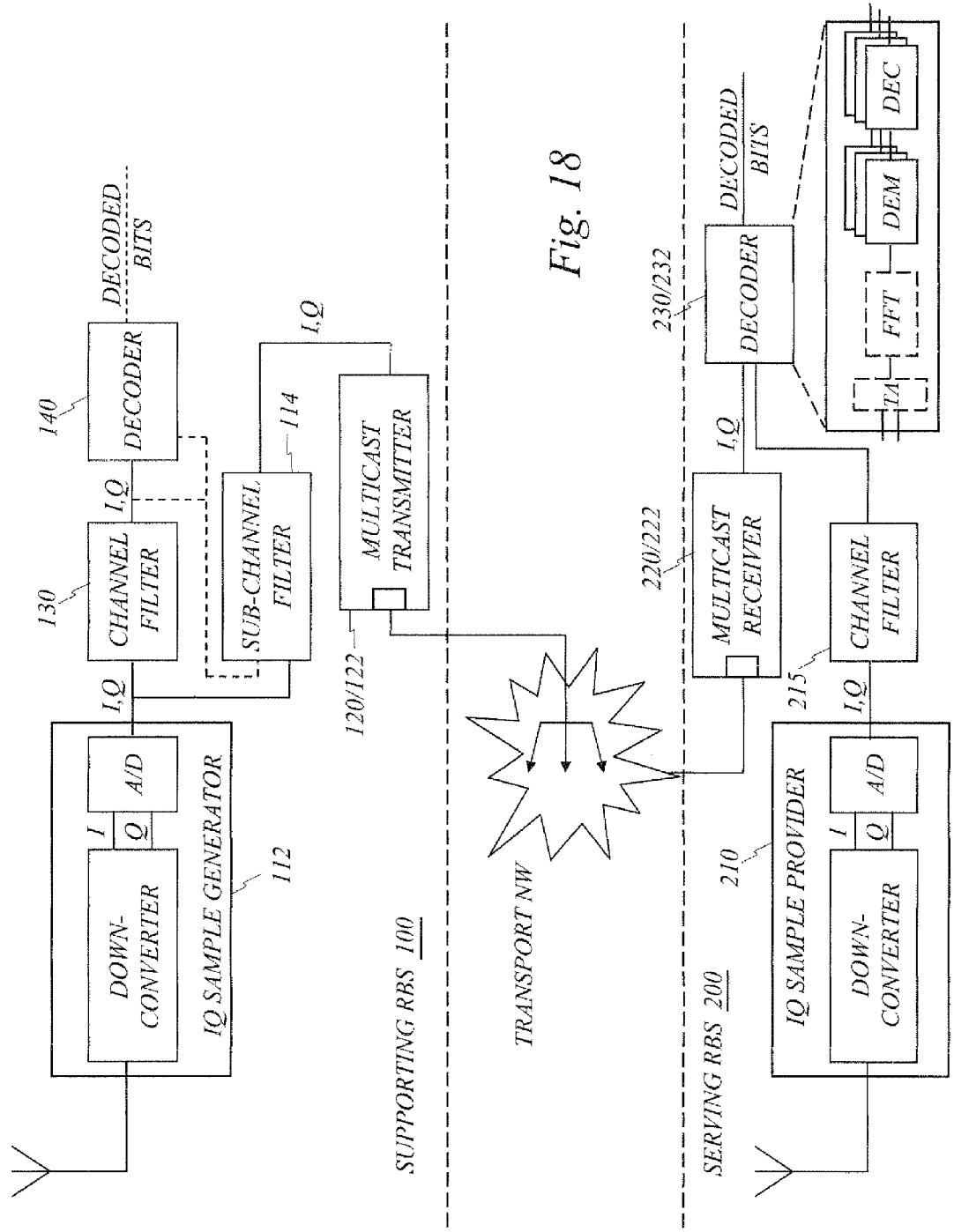
FIG. 18 is a schematic block diagram illustrating an example of a supporting radio base station and a serving radio base station, respectively, configured for COMP operation according to a further illustrative embodiment.

FIG. 18 is a schematic block diagram illustrating an example of a supporting radio base station and a serving radio base station, respectively, configured for COMP operation according to a further illustrative embodiment.

In this particular example, the supporting RBS 100 includes an IQ sample generator 112, an extractor in the form of a sub-channel filter 114, and a multicast transmitter/network interface 122, a conventional channel filter 130 and a decoder 140.

The IQ sample generator 112 is based on a conventional down-converter for down-converting the received radio signals from carrier frequency to baseband and providing analogue IQ signals, and an A/D converter for converting the analogue IQ signals into digital IQ samples. The IQ samples may then be transferred to the conventional channel filter 130 and subsequent decoder 140 to provide decoded bits.

As mentioned, the supporting RBS 100 also comprises an extractor in the form of one or more sub-channel filters 114 configured to extract IQ samples in a respective selected subset of the available frequency band.

The sub-channel filter 114 is connected to the multicast transmitter 122 to allow transfer of these so-called complementary IQ samples over the transport network to the serving RBS 200. A multicast group is associated with the IQ samples extracted in the respective subset of the available frequency band. This subset of the available frequency band is also reserved for a subset of UEs on the uplink for which the serving RBS 200 will benefit from receiving complementary IQ samples from the supporting RBS 100.

In this example, the idea is thus to introduce at least one additional channel filter, configured to filter out a subset of the total bandwidth of the receiver. The IQ samples out from this sub-channel filter are sent onto a transport network to another RBS and fed into the digital receiver of this RBS.

The sub-channel filter 114 may take IQ samples in the time-domain and/or frequency-domain as input, and may take IQ samples from the output of the IQ sample generator 112, the channel filter 130 and/or from one of the stages within the decoder 140.

The sub-channel filter can be implemented in a variety of different ways. For example, the sub-channel filter may be realized as

- A filter within the radio unit of the RBS. For instance, if the technology disclosed herein is applied in a WCDMA system with support for 3 carriers of 5 MHz each, the sub-channel filter may filter out one or two of the WCDMA carriers. The sub-channel filter can then be the same filter as one of the per-carrier filters in the radio. The interface to the transport network can then be located either in the radio or in the Baseband (BB) unit of the RBS.
- The sub-channel filter can be a digital filter, such as a FIR filter, in the base band unit. The filter then typically operates on the same IQ samples as sent to the digital receiver/decoder.
- The sub-channel filter can also be implemented as a Fast Fourier Transform (FFT) in the supporting RBS 100 and a corresponding Inverse FFT (IFFT) in the serving RBS 200, where only a part of the frequency domain samples are sent over the transport network. The advantage is that the frequency band that the sub-channel filter cuts out can be disjunct. For instance, a part of the frequency band used by LTE for the Physical Uplink Shared Channel (PUSCH) is filtered out as well as the frequency band used for the Physical Uplink Control Channel (PUCCH).

In addition, it is also possible to provide a realization by which only a portion of the available antennas of the supporting RBS 100 may be subject to the sub-channel filter, to decrease the interface load and hardware cost.

The serving RBS 200 includes an IQ sample provider 210, a conventional channel filter 215, a multicast receiver 222, and a decoder 230/232.

The IQ sample provider 210 is based on a conventional down-converter for down-converting the received radio signals from carrier frequency to baseband and providing analogue IQ signals, and an A/D converter for converting the analogue IQ signals into digital IQ samples. The IQ samples may then be transferred to the conventional channel filter 215 and subsequent decoder 230/232.

The multicast receiver 222 is configured to receive complementary IQ samples, via a network interface to the transport network, for a desired multicast group. The decoder 230/232 is configured to process the received complementary IQ samples and the IQ samples from the channel filter 215 to provide decoded bits.

In general, the decoder includes a time aligner (TA) for time-aligning own IQ samples and complementary IQ samples per UE, when required. The time-alignment function may alternatively be performed prior to the channel filter 215.

The decoder may be different for each standard. In LTE, for example, the decoder includes a cell global FFT. The FFT is synchronous to the air interface and is executed once every received symbol. One demodulator (DEM) is normally executed per UE, where the demodulator may perform diversity combining, equalization, frequency compensation and other algorithms to best determine the likely received symbols. The soft values from each demodulator are then sent to a respective decoder (DEC) unit, which takes a "final" decision of the received bits.

For LTE, for example, the UL receiver normally begins with a large FFT, over the whole band. All UEs are preferably time aligned, within the cyclic prefix (CP), typically in the order of 4 μs. It is proposed to transfer UL IQ samples from the supporting RBS, and let the serving RBS align the FFTs for a certain user. This also reduces the need for control signaling between the serving and supporting RBS, and any software complexity associated with supporting RBS needing to know the UEs of the serving RBS.

In WCDMA, the IQ samples are normally fed directly into a per-UE specific demodulator, which includes, in addition to the demodulator of LTE, a rake receiver for despreading the CDMA signal.

In general, any of a number of conventional multicast techniques may be used with the technology disclosed herein. For example, the multicast group may be a Virtual Local Area Network (VLAN) group or an Internet Protocol (IP) multicast group, and the transport network may be e.g. an Ethernet network or any other suitable transport network.

As previously explained, the radio base stations 100 and 200 may be on different levels in a hierarchical cellular network. For example, the serving radio base station 200 may be a micro cell radio base station configured for cooperation with the supporting radio base station 100, which is in the form of a macro cell radio base station.

Figure 19:
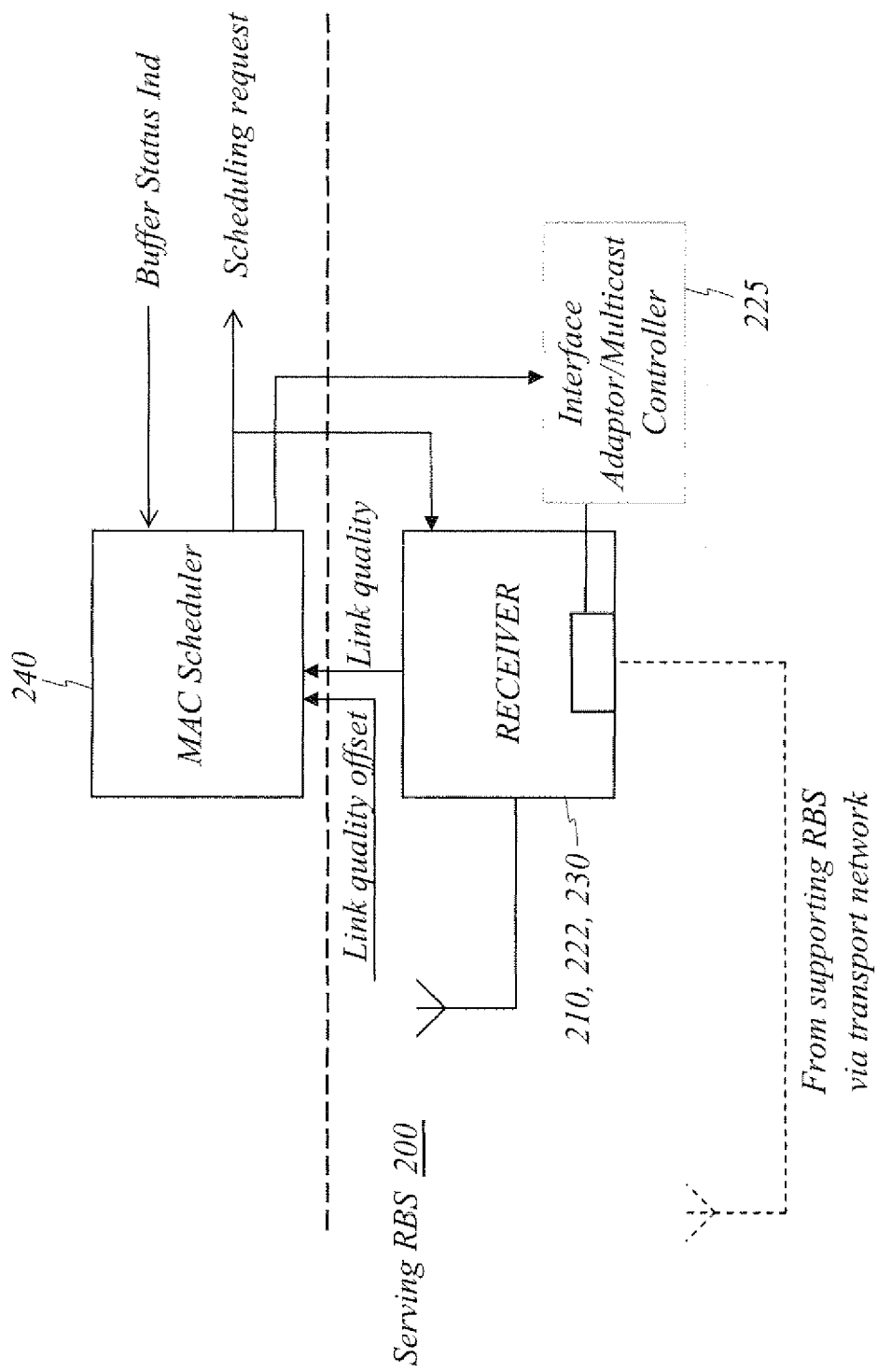
FIG. 19 is a schematic block diagram illustrating an example of a serving radio base station according to an illustrative embodiment.

FIG. 19 is a schematic block diagram illustrating an example of a serving radio base station according to an illustrative embodiment. The radio base station 200 includes a receiver 210, 222, 230 that has functionalities for providing IQ samples based on received radio signals, multicast reception via a network interface, and IQ sample processing and decoding. The radio base station further comprises an interface adaptor/multicast controller 225, and optionally also a MAC scheduler 240.

In LTE, the MAC scheduler is generally responsible for selecting which UEs are allowed to transmit at what time, and at what frequency. In WCDMA, the MAC scheduler normally determines the maximum rate a UE may use.

The MAC scheduler typically informs the UE about the decision, indicated with a scheduling message to the UE. The same information is sent to the digital receiver.

The decision is normally based on the amount of data the UE has in its buffers (LTE) and the link quality for the UE (LTE, WCDMA). Of course, also other things as the air interface load, processing capabilities and so forth may be included as a basis for the decision.

For WCDMA, the MAC scheduler for the circuit switched traffic is located in the RNC. The bit rate used by the UE is then controlled by even higher layers, by means of channel switching.

The receiver is extended with IQ inputs from the supporting RBS. For both LTE and WCDMA, the MAC scheduler 240 may communicate with the interface adaptor 225 about entering and leaving multicast groups such as VLANs, depending on which multicast groups are of interest to receive 10 data from. For WCDMA, this may also be a static configuration, or controlled by the RNC.

In this example, the Link Quality information may be offset with the likelihood that the supporting RBS antennas can be used for receiving the UE, in the specific part of the spectrum that the supporting RBS forwards data. The likelihood is determined, e.g. from previous reception from that supporting RBS, or based on the downlink (DL) measurements done for mobility—if the DL signal is about the same from the serving and supporting RBS, it can be assumed that the link quality is doubled compared to that measured only from the serving RBS.

It is here assumed that the MAC scheduler has been informed about the possible multicast groups. It is also preferred that the MAC Scheduler can be informed about the DL measurements made by the UE and reported over RRC. If not, the MAC scheduler will have to work based on more predefined expected gains of using supporting RBSs.

By offsetting the link quality this way, a normal fairness algorithm will prioritize UEs with weak UL in the frequency band where complementary assistance data (IQ samples) can be received.

For circuit switched traffic, the multicast group (e.g. VLANs) to enter is likely static, and the carrier covered by the multicast group becomes a preferred WCDMA carrier for weak UEs. The RNC can hand over UEs to this WCDMA carrier.

Figure 20:
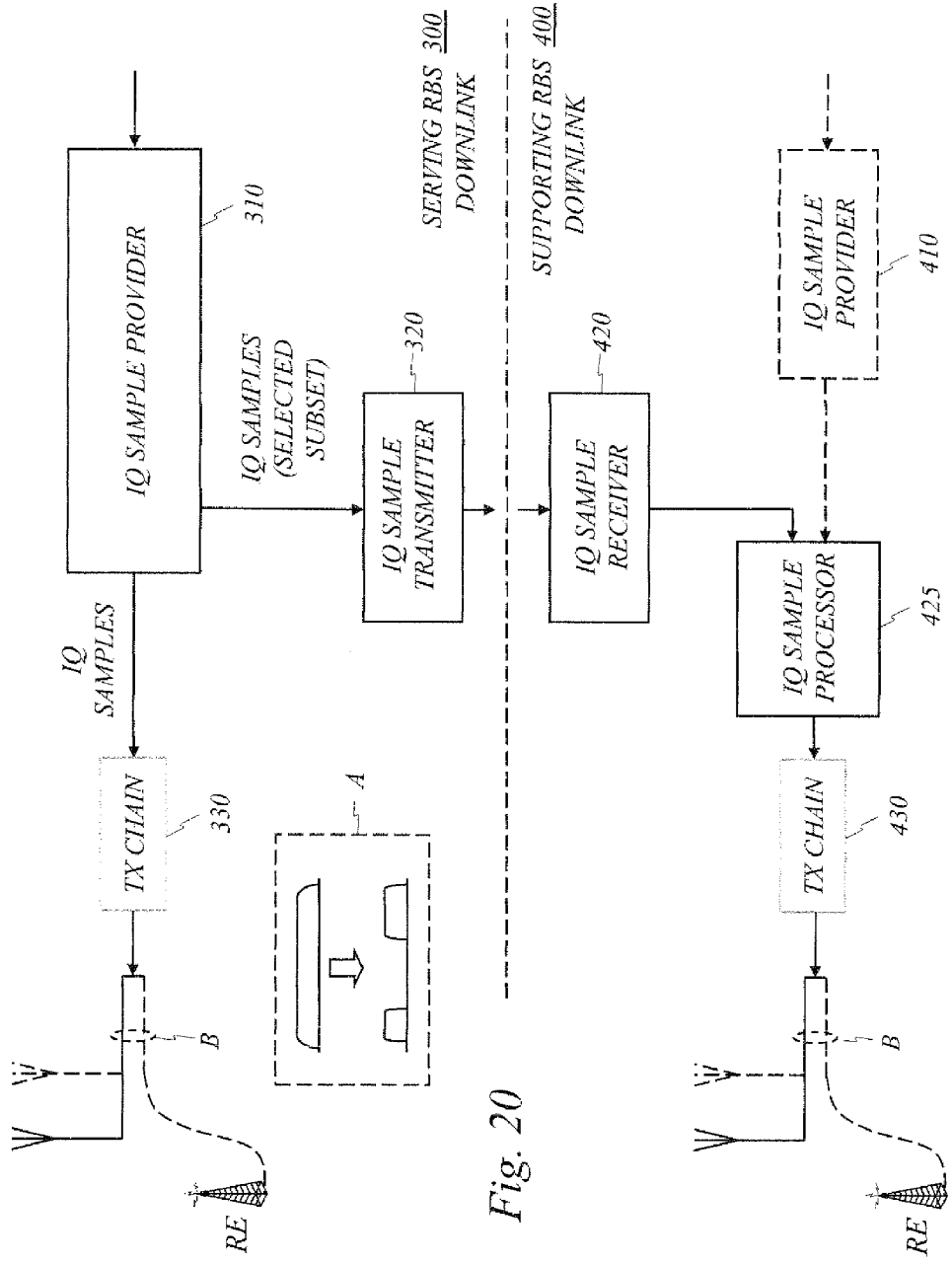
FIG. 20 is a schematic block diagram illustrating an example of a serving radio base station and a supporting radio base station, respectively, configured for COMP operation for the downlink according to an illustrative embodiment.

FIG. 20 is a schematic block diagram illustrating an example of a serving radio base station and a supporting radio base station, respectively, configured for COMP operation for the downlink according to an illustrative embodiment.

Well-known standard circuitry including basic transmission/reception circuitry and standard processing capabilities of a radio base station will not be described, unless for its relevance to COMP operation of the technology disclosed herein.

The serving radio base station 300 comprises an In-phase and Quadrature-phase (IQ) sample provider 310 configured to provide IQ samples for transfer to the standard transmission (TX) chain 330 of the RBS as normal. The IQ sample provider 310 is further configured to extract IQ samples for a selected subset of the available frequency band (A) and/or a selected subset of the available antennas (B). These IQ samples correspond to a downlink transmission intended for at least one UE. The radio base station 300 further comprises an IQ sample transmitter 320 configured to transmit, to at least one supporting radio base station, the IQ samples to enable the at least one supporting radio base station 400 to assist in the downlink transmission in the selected subset of the available frequency band and/or from the selected subset of the available antennas.

For example, the IQ sample provider 310 may include an IQ sample generator that provides the basic IQ samples and an extractor that extracts IQ samples for a selected subset of the frequency band and/or a selected subset of the antennas.

The supporting radio base station 400 illustrated in the example of FIG. 20 comprises an In-phase and Quadrature-phase (IQ) sample receiver 420 configured to receive, from the serving radio base station, IQ samples provided for a selected subset of the available frequency band and/or a selected subset of the available antennas. The IQ samples correspond to a downlink transmission intended for at least one UE. The radio base station 400 further comprises an IQ sample processor 425 configured to process the received IQ samples for downlink transmission in the selected subset of the available frequency band and/or from the selected subset of the available antennas. Preferably, the processed IQ samples are transferred to the standard transmission (TX) chain 430 of the RBS 400.

Optionally, the RBS 400 also comprises an IQ sample provider 410 for providing own IQ samples for downlink transmission.

It should be understood that the multicast feature previously described for the uplink may also be adapted for use on the downlink, if desired. In such a case, the IQ sample transmitter 320 includes a multicast transmitter, and the IQ sample receiver 420 includes a multicast receiver. In this way, the IQ samples can be exchanged between the radio base stations by multicasting via suitable transport network.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any of the radio base stations. It may also be possible to re-use existing software, e.g. by reprogramming of the existing software or by adding new software components.

The software may be realized as a computer program product, which is normally carried on a computer-readable medium. The software may thus be loaded into the operating memory of a computer or equivalent processing system for execution by a processor. The computer/processor does not have to be dedicated to only execute the above-described steps, functions, procedure and/or blocks, but may also execute other software tasks.

In the following, so-called itemized embodiments will be summarized.

AA. A method for Coordinated MultiPoint, COMP, operation for a supporting radio base station cooperating with a serving radio base station in a cellular communication network, the method comprising the steps of:

the supporting radio base station extracting, in a selected subset of the available frequency band and/or from a selected subset of the available antennas, In-phase and Quadrature-phase, IQ, samples, referred to as complementary IQ samples, based on received radio signals including a radio signal originating from an uplink transmission of at least one user equipment, UE, served by the serving radio base station;

the supporting radio base station transmitting the complementary IQ samples to the serving radio base station to enable the serving radio base station to decode user data of the uplink transmission based on the complementary IQ samples together with own IQ samples provided by the serving radio base station.

AB. The method of item AA, wherein the supporting radio base station is transmitting, via a network interface to a transport network, the complementary IQ samples to a multicast group that includes the serving radio base station, wherein the complementary IQ samples extracted at the supporting radio base station in the subset of the available frequency band and/or from the subset of the available antennas are associated with the multicast group.

AC. The method of item AB, wherein the multicast group is associated with a cell of the supporting radio base station, and the complementary IQ samples are IQ samples extracted based on received radio signals at the supporting radio base station in the subset of the available frequency band and/or from the subset of the available antennas for the cell.

AD. The method of item AB, wherein the multicast group is associated with IQ samples extracted at the supporting radio base station in the subset of the available frequency band, and the subset of the available frequency band also being reserved for a subset of UEs served by the serving radio base station.

AE. The method of item AD, further comprising the step of associating the complementary IQ samples extracted at the supporting radio base station in the subset of the available frequency band with the multicast group by assigning a dedicated multicast address to the subset of the available frequency band.

AF. The method of item AB, wherein the supporting radio base station is transmitting the complementary IQ samples to a multicast group that also includes an additional serving radio base station to enable the additional serving radio base station to decode user data of an uplink transmission of at least one UE served by the additional serving radio base station based on the complementary IQ samples together with own IQ samples provided by the additional serving radio base station.

AG. The method of item AB, wherein the supporting radio base station is associating each of a number of cells with at least one multicast group and extracting, for each of the at least one multicast group, complementary IQ samples in a respective subset of the available frequency band, and transmitting, via the network interface to the transport network, the complementary IQ samples in the respective subset of the available frequency band to the associated multicast group.

AH. The method of item AB, wherein the multicast group is a Virtual Local Area Network, VLAN, group or an Internet Protocol, IP, multicast group, and the transport network is an Ethernet network.

AI. The method of item AB, wherein the multicast is implemented as a broadcast within a Virtual Local Area Network, VLAN, IQ samples are packaged into Ethernet packets and transmitted as broadcast on the multicast address, each complementary IQ samples being tagged with a multicast group tag.

AJ. The method of item AA, wherein the complementary IQ samples in the subset of the available frequency band are extracted for a selected subset of available carriers.

AK. A method for Coordinated MultiPoint, COMP, operation for a serving radio base station serving user equipment, UE, in a cellular communication network, the method comprising the steps of:
  the serving radio base station providing In-phase and Quadrature-phase, IQ, samples, referred to as own IQ samples, based on received radio signals including a radio signal originating from an uplink transmission of at least one UE;
  the serving radio base station receiving, from a supporting radio base station, complementary IQ samples extracted based on received radio signals at the supporting radio base station in a selected subset of the available frequency band and/or from a selected subset of the available antennas; and
  the serving radio base station processing the own IQ samples and the complementary IQ samples to decode user data of the uplink transmission.

AL. The method of item AK, wherein the serving radio base station is joining a multicast group for receiving, via a network interface to a transport network, the complementary IQ samples from a supporting radio base station, wherein the complementary IQ samples extracted at the supporting radio base station in the subset of the available frequency band and/or from a subset of the available antennas are associated with the multicast group.

AM. The method of item AK, wherein the subset of the available frequency band also being reserved for a subset of UEs served by the serving radio base station.

AN. The method of item AL, wherein the step of the serving radio base station joining a multicast group includes the steps of:
  the serving radio base station requesting to join the multicast group;
  the serving radio base station obtaining information representative of a multicast address of the multicast group corresponding to the subset of the available frequency band;
  the serving radio base station configuring the network interface for reception on the multicast address of the multicast group.

AO. The method of item AL, wherein the multicast group is associated with a cell of the supporting radio base station, and the complementary IQ samples are IQ samples extracted based on received radio signals at the supporting radio base station in the subset of the available frequency band and/or from the subset of the available antennas for the cell.

AP. The method of item AL, wherein the serving radio base station is determining to join the multicast group based on neighbor list information and/or signal strength measurements.

AQ. The method of item AL, wherein the multicast group is a Virtual Local Area Network, VLAN, group or an Internet Protocol, IP, multicast group, and the transport network is an Ethernet network.

AR. The method of item AK, wherein the step of the serving radio base station processing the own IQ samples and the complementary IQ samples comprises the step of time-aligning the IQ samples per UE.

AS. A method for Coordinated MultiPoint, COMP, operation for a supporting radio base station cooperating with a serving radio base station serving user equipment, UE, in a cellular communication network, the method comprising the steps of:
  the supporting radio base station receiving, from the serving radio base station, In-phase and Quadrature-phase, IQ, samples provided for a selected subset of the available frequency band and/or a selected subset of the available antennas, the IQ samples corresponding to a downlink transmission intended for at least one UE;
  the supporting radio base station processing the received IQ samples for downlink transmission in the selected subset of the available frequency band and/or from the selected subset of the available antennas.

AT. A method for Coordinated MultiPoint, COMP, operation for a serving radio base station serving user equipment, UE, in a cellular communication network, the method comprising the steps of:
  the serving radio base station providing In-phase and Quadrature-phase, IQ, samples for a selected subset of the available frequency band and/or a selected subset of the available antennas, the IQ samples corresponding to a downlink transmission intended for at least one UE;
  the serving radio base station transmitting, to at least one supporting radio base station, the IQ samples to enable the at least one supporting radio base station to assist in the downlink transmission in the selected subset of the available frequency band and/or from the selected subset of the available antennas.

AU. A radio base station, referred to as a supporting radio base station, configured for Coordinated MultiPoint, COMP, operation in cooperation with a serving radio base station serving user equipment, UE, in a cellular communication network, the radio base station comprising:
- an In-phase and Quadrature-phase, IQ, sample provider configured to extract, in a selected subset of the available frequency band and/or from a selected subset of the available antennas, IQ samples, referred to as complementary IQ samples, based on received radio signals including a radio signal originating from an uplink transmission of at least one UE served by the serving radio base station;
- an IQ sample transmitter configured to transmit the complementary IQ samples to the serving radio base station to enable the serving radio base station to decode user data of the uplink transmission based on the complementary IQ samples together with own IQ samples provided by the serving radio base station.

AV. The radio base station of item AU, wherein IQ sample transmitter includes a multicast transmitter configured to transmit, via a network interface to a transport network, the complementary IQ samples to a multicast group that includes the serving radio base station, wherein the complementary IQ samples extracted at the supporting radio base station in the subset of the available frequency band and/or from the subset of the available antennas are associated with the multicast group.

AX. The radio base station of item AV, wherein the IQ sample provider comprises an extractor configured to extract the complementary IQ samples in the subset of the available frequency band and/or from the subset of the available antennas.

AY. The radio base station of item AX, wherein the extractor comprises a sub-channel filter configured to extract IQ samples in the subset of the available frequency band, and the multicast group is associated with the IQ samples extracted in the subset of the available frequency band, and the subset of the available frequency band also being reserved for a subset of UEs served by the serving radio base station.

AZ. The radio base station of item AX, wherein the radio base station is configured for associating the complementary IQ samples extracted in the subset of the available frequency band with the multicast group by assigning a dedicated multicast address to the subset of the available frequency band.

BA. The radio base station of item AX, wherein the extractor is configured to extract the complementary IQ samples for a selected subset of available carriers.

BB. The radio base station of item AV, wherein the radio base station is configured to associate each of a number of cells with at least one multicast group and the IQ sample provider is configured to extract, for each of the at least one multicast group, complementary IQ samples in a respective subset of the available frequency band, and the multicast transmitter is configured to transmit, via the network interface to the transport network, the complementary IQ samples in the respective subset of the available frequency band to the associated multicast group.

BC. The radio base station of item AV, wherein the multicast group is a Virtual Local Area Network, VLAN, group or an Internet Protocol, IP, multicast group, and the transport network is an Ethernet network.

BD. A radio base station configured for Coordinated Multi-Point, COMP, operation and for serving user equipment, UE, in a cellular communication network, the radio base station comprising:
- an In-phase and Quadrature-phase, IQ, sample provider configured to provide IQ samples, referred to as own IQ samples, based on received radio signals including a radio signal originating from an uplink transmission of at least one UE;
- an IQ sample receiver configured to receive, from a supporting radio base station, complementary IQ samples extracted based on received radio signals at the supporting radio base station in a selected subset of the available frequency band and/or from a selected subset of the available antennas; and
- an IQ sample processor configured to process the own IQ samples and the complementary IQ samples to decode user data of the uplink transmission.

BE. The radio base station of item BD, wherein the IQ sample receiver comprises a multicast receiver configured to join a multicast group for receiving, via a network interface to a transport network, the complementary IQ samples from the supporting radio base station.

BF. The radio base station of item BE, wherein the radio base station comprises a multicast controller configured for requesting to join the multicast group, for obtaining a corresponding multicast address, and for configuring the network interface for reception on the multicast address of the multicast group.

BG. The radio base station of item BE, wherein the multicast group is associated with IQ samples extracted at the supporting radio base station in the subset of the available frequency band, and the subset of the available frequency band also being reserved for a subset of UEs served by the serving radio base station.

BH. The radio base station of item BG, wherein the radio base station comprises a multicast controller configured for requesting to join the multicast group, obtaining information representative of a multicast address of the multicast group corresponding to the subset of the available frequency band, and configuring the network interface for reception on the multicast address of the multicast group.

BI. The radio base station of item BE, wherein the multicast group is associated with a cell of the supporting radio base station, and the complementary IQ samples being extracted based on received radio signals in the subset of the available frequency band and/or from the subset of the available antennas for the cell.

BJ. The radio base station of item BE, wherein the radio base station is configured for determining to join the multicast group based on neighbor list information and/or signal strength measurements.

BK. The radio base station of item BE, wherein the multicast group is a Virtual Local Area Network, VLAN, group or an Internet Protocol, IP, multicast group, and the transport network is an Ethernet network.

BL. The radio base station of item BD, wherein the IQ sample processor comprises a time-aligner for time-aligning the own IQ samples and the complementary IQ samples per UE.

BM. A radio base station configured for Coordinated Multi-Point, COMP, operation and for serving user equipment (UE) in a cellular communication network, the radio base station comprising:
- an In-phase and Quadrature-phase, IQ, sample provider configured to extract IQ samples for a selected subset of the available frequency band and/or a selected subset of the available antennas, the IQ samples corresponding to a downlink transmission intended for at least one UE;
- an IQ sample transmitter configured to transmit, to at least one supporting radio base station, the IQ samples to enable the at least one supporting to radio base station to assist in the downlink transmission in the selected subset of the available frequency band and/or from the selected subset of the available antennas.

BN. A radio base station, referred to as a supporting radio base station, configured for Coordinated MultiPoint, COMP, operation in cooperation with a serving radio base station serving user equipment, UE, in a cellular communication network, the radio base station comprising:

an In-phase and Quadrature-phase, IQ, sample receiver configured to receive, from the serving radio base station, IQ samples provided for a selected subset of the available frequency band and/or a selected subset of the available antennas, the IQ samples corresponding to a downlink transmission intended for at least one UE;

an IQ sample processor configured to process the received IQ samples for downlink transmission in the selected subset of the available frequency band and/or from the selected subset of the available antennas.

The embodiments described above are to be understood as a few illustrative examples of the technology disclosed herein. It will be understood by those skilled in the art that various modifications, combinations and changes may be made to the embodiments without departing from the scope of the technology disclosed herein. In particular, different part solutions in the different embodiments can be combined in other configurations, where technically possible. The scope of the technology disclosed herein is, however, defined by the appended claims.

REFERENCES

[1] *Performance of the LTE Uplink with Intra-Site Joint Detection and Joint Link Adaptation*, by A. Müller et al., VTC Spring, 2010.

[2] *Distributed Uplink Signal Processing of Cooperating base Stations based on IQ Sample Exchange*, by C. Hoymann et al., Proceedings of the IEEE ICC, 2009.

The invention claimed is:

1. A method for Coordinated MultiPoint (COMP) operation for a supporting radio base station cooperating with a serving radio base station in a cellular communication network, said method comprising:

said supporting radio base station extracting, in a selected subset of an available frequency band, a limited set of In-phase and Quadrature-phase (IQ) samples for use as complementary IQ samples, based on received radio signals including a radio signal originating from an uplink transmission of at least one user equipment (UE) served by said serving radio base station; and said supporting radio base station transmitting said complementary IQ samples extracted in the selected subset of the available frequency band to said serving radio base station to schedule a user equipment, having problems with the uplink, on the selected subset of the frequency band and decode user data of said uplink transmission based on said complementary IQ samples together with own IQ samples provided by said serving radio base station, wherein the selected subset is less than an entirety of the available frequency band available for use by the serving radio base station, wherein the step of transmitting the complementary IQ samples comprises said supporting radio base station transmitting, via a network interface to a transport network, said complementary IQ samples to a multicast group that includes said serving radio base station, and wherein said complementary IQ samples extracted at said supporting radio base station in said subset of the available frequency band and/or from a subset of the available antennas are associated with the said multicast group.

2. The method of claim 1, wherein said multicast group is associated with a cell of the supporting radio base station, and wherein said complementary IQ samples are IQ samples extracted based on the received radio signals at said supporting radio base station in said subset of the available frequency band and/or from said subset of the available antennas for said cell.

3. The method of claim 1, wherein said multicast group is associated with the IQ samples extracted at said supporting radio base station in said subset of the available frequency band, and wherein said subset of the available frequency band are reserved for a subset of UEs served by said serving radio base station.

4. The method of claim 3, further comprising associating said complementary IQ samples extracted at said supporting radio base station in said subset of the available frequency band with said multicast group by assigning a dedicated multicast address to said subset of the available frequency band.

5. The method of claim 1, wherein said multicast is implemented as a broadcast within a Virtual Local Area Network (VLAN) IQ samples packaged into Ethernet packets and transmitted as broadcast on the multicast address, each complementary IQ samples being tagged with a multicast group tag.

6. A method for Coordinated MultiPoint (COMP) operation for a serving radio base station serving user equipment (UE) in a cellular communication network, said method comprising:

said serving radio base station providing In-phase and Quadrature-phase (IQ) samples for use as own IQ samples, based on received radio signals including a radio signal originating from an uplink transmission of at least one UE;

said serving radio base station receiving, from a supporting radio base station, complementary IQ samples extracted as a limited set of IQ samples based on received radio signals at said supporting radio base station in a selected subset of the available frequency band, wherein said serving radio base station schedules a user equipment, having problems on the uplink, on the selected subset of the frequency band; and said serving radio base station processing said own IQ samples and said complementary IQ samples extracted in the selected subset of the available frequency band to decode user data of said uplink transmission, wherein the selected subset is less than an entirety of the available frequency band available for use by the serving radio base station, wherein the method further comprises said serving radio base station joining a multicast group for receiving, via a network interface to a transport network, said complementary IQ samples from the supporting radio base station, and wherein said complementary IQ samples extracted at said supporting radio base station in said subset of the available frequency band and/or from a subset of the available antennas are associated with the said multicast group.

7. The method of claim 6, wherein said subset of the available frequency band are reserved for a subset of UEs served by said serving radio base station.

8. The method of claim 6, wherein joining the multicast group comprises:
- said serving radio base station requesting to join said multicast group;
- said serving radio base station obtaining information representative of a multicast address of said multicast group corresponding to said subset of the available frequency band; and
- said serving radio base station configuring said network interface for reception on said multicast address of said multicast group.

9. The method of claim 6,
- wherein said multicast group is associated with a cell of the supporting radio base station, and
- wherein said complementary IQ samples are IQ samples extracted based on the received radio signals at said supporting radio base station in said subset of the available frequency band and/or from said subset of the available antennas for said cell.

10. The method of claim 6,
- wherein said multicast group is a Virtual Local Area Network (VLAN) group or an Internet Protocol (IP) multicast group, and
- wherein said transport network is an Ethernet network.

11. A supporting radio base station configured for Coordinated MultiPoint (COMP) operation in cooperation with a serving radio base station serving user equipment (UE) in a cellular communication network, said supporting radio base station comprising:
- an In-phase and Quadrature-phase (IQ) sample provider configured to extract, in a selected subset of an available frequency band, a limited set of IQ samples for use as complementary IQ samples, based on received radio signals including a radio signal originating from an uplink transmission of at least one UE served by said serving radio base station, the selected subset having been selected prior to scheduling of the at least one UE and other UEs on the selected subset; and
- an IQ sample transmitter configured to transmit said complementary IQ samples extracted in the selected subset of the available frequency band to said serving radio base station to enable said serving radio base station to schedule a user equipment, having problems with the uplink, on the selected subset of the available frequency band and decode user data of said uplink transmission based on said complementary IQ samples together with own IQ samples provided by said serving radio base station,
- wherein the selected subset is less than an entirety of the available frequency band available for use by the serving radio base station,
- wherein IQ sample transmitter includes a multicast transmitter configured to transmit, via a network interface to a transport network, said complementary IQ samples to a multicast group that included said serving radio base station, and
- wherein said complementary IQ samples extracted at said supporting radio base station in said subset of the available frequency band and/or from a subset of the available antennas are associated with the said multicast group.

12. The supporting radio base station of claim 11, wherein said IQ sample provider comprises an extractor configured to extract said complementary IQ samples in said subset of the available frequency band and/or from said subset of the available antennas.

13. The supporting radio base station of claim 12,
- wherein said extractor comprises a sub-channel filter configured to extract the IQ samples in said subset of the available frequency band,
- wherein said multicast group is associated with the IQ samples extracted in said subset of the available frequency band, and
- wherein said subset of the available frequency band are reserved for a subset of UEs served by said serving radio base station.

14. The supporting radio base station of claim 12, wherein said supporting radio base station is configured for associating said complementary IQ samples extracted in said subset of the available frequency band with said multicast group by assigning a dedicated multicast address to said subset of the available frequency band.

15. A serving radio base station configured for Coordinated MultiPoint (COMP) operation and for serving user equipment (UE) in a cellular communication network, said serving radio base station comprising:
- an In-phase and Quadrature-phase IQ) sample provider configured to provide IQ samples, referred to as own IQ samples, based on received radio signals including a radio signal originating from uplink transmission of at least one UE;
- an IQ sample receiver configured to receive, from a supporting radio base station, complementary IQ samples extracted as a limited set of IQ samples based on received radio signals at said supporting radio base station in a selected subset of the available frequency band, wherein said serving radio base station is configured to schedule a UE, having problems with the uplink, on the selected subset of the available frequency band; and
- an IQ sample processor configured to process said own IQ samples and said complementary IQ samples extracted in the selected subset of the available frequency band to decode user data of said uplink transmission,
- wherein the selected subset is less than an entirety of the available frequency band available for use by the serving radio base station, and
- wherein said IQ sample receiver comprises a multicast receiver configured to join a multicast group for receiving, via a network interface to a transport network, said complementary IQ samples from said supporting radio base station, and
- wherein said complementary IQ samples extracted at said supporting radio base station in said subset of the available frequency band and/or from a subset of the available antennas are associated with said multicast group.

16. The serving radio base station of claim 15, comprising a multicast controller configured for requesting to join said multicast group, for obtaining a corresponding multicast address, and for configuring said network interface for reception on said multicast address of said multicast group.

17. The serving radio base station of claim 15,
- wherein said multicast group is associated with IQ samples extracted at said supporting radio base station in said subset of the available frequency band, and
- wherein said subset of the available frequency band are reserved for a subset of UEs served by said serving radio base station.

18. The serving radio base station of claim 17, comprising a multicast controller configured for requesting to join said multicast group, obtaining information representative of a multicast address of said multicast group corresponding to said subset of the available frequency band, and configuring said network interface for reception on said multicast address of said multicast group.

19. The method of claim 1, further comprising said supporting radio base station extracting the complementary IQ samples in the selected subset of the available frequency band and from a selected subset of the available antennas.

20. The method of claim 6, further comprising said serving radio base station receiving the complementary IQ samples extracted in the selected subset of the available frequency band and from a selected subset of the available antennas.

21. The supporting radio base station of claim 11, wherein said IQ sample provider is configured to extract the complementary IQ samples in the selected subset of the available frequency band and from a selected subset of the available antennas.

22. The serving radio base station of claim 15, wherein said IQ sample receiver is configured to receive the complementary IQ samples extracted in the selected subset of the available frequency band and from a selected subset of the available antennas.

23. The method of claim 1, wherein the selected subset of the available frequency band are reserved for a subset of UEs served by the serving radio base station.

24. The method of claim 23, wherein the subset of UEs include UEs within a proximity of an edge of a cell of the serving radio base station.

25. The method of claim 23, wherein the subset of UEs include UEs in a portion of a cell of the serving radio base station that overlaps a cell of the supporting radio base station.

26. The method of claim 7, wherein the subset of UEs include UEs within a proximity of an edge of a cell of the serving radio base station.

27. The method of claim 7, wherein the subset of UEs include UEs in a portion of a cell of the serving radio base station that overlaps a cell of the supporting radio base station.

28. The supporting radio base station of claim 12, wherein the selected subset of the available frequency band are reserved for a subset of UEs served by the serving radio base station.

29. The supporting radio base station of claim 28, wherein the subset of UEs include UEs within a proximity of an edge of a cell of the serving radio base station.

30. The supporting radio base station of claim 29, wherein the subset of UEs include UEs in a portion of a cell of the serving radio base station that overlaps a cell of the supporting radio base station.

31. The serving radio base station of claim 15, wherein the selected subset of the available frequency band are reserved for a subset of UEs served by the serving radio base station.

32. The serving radio base station of claim 31, wherein the subset of UEs include UEs within a proximity of an edge of a cell of the serving radio base station.

33. The serving radio base station of claim 31, wherein the subset of UEs include UEs in a portion of a cell of the serving radio base station that overlaps a cell of the supporting radio base station.

* * * * *